(12) United States Patent
Flanagan

(10) Patent No.: US 11,151,762 B2
(45) Date of Patent: Oct. 19, 2021

(54) SYSTEMS AND METHODS FOR SHARED VISUALIZATION AND DISPLAY OF DRILLING INFORMATION

(71) Applicant: Ubiterra Corporation, Denver, CO (US)

(72) Inventor: Peter W. Flanagan, Denver, CO (US)

(73) Assignee: Ubiterra Corporation, Denver, CO (US)

( * ) Notice: Subject to any disclaimer, the term of this patent is extended or adjusted under 35 U.S.C. 154(b) by 468 days.

(21) Appl. No.: 15/662,030

(22) Filed: Jul. 27, 2017

(65) Prior Publication Data
US 2017/0352169 A1 Dec. 7, 2017

Related U.S. Application Data

(63) Continuation-in-part of application No. 15/343,007, filed on Nov. 3, 2016.
(Continued)

(51) Int. Cl.
*G06T 11/20* (2006.01)
*G06F 3/14* (2006.01)
(Continued)

(52) U.S. Cl.
CPC ............ *G06T 11/206* (2013.01); *E21B 44/00* (2013.01); *E21B 47/024* (2013.01); *E21B 47/09* (2013.01);
(Continued)

(58) Field of Classification Search
CPC ......... G06T 11/206; G06T 7/60; G06T 19/20; G06T 2207/20101; G06T 2210/21;
(Continued)

(56) References Cited

U.S. PATENT DOCUMENTS

| 4,072,200 A | 2/1978 | Morris |
| 4,372,398 A | 2/1983 | Kuckes |

(Continued)

OTHER PUBLICATIONS

Rolv Rommetveit, et. al., eDrilling: A System for Real-Time Drilling Simulation, 3D Visualization, and Control, SPE 106903, Apr. 11-12, 2007. (Year: 2007).*

(Continued)

*Primary Examiner* — Justin C Mikowski
(74) *Attorney, Agent, or Firm* — Polsinelli PC

(57) ABSTRACT

A method of visualizing drilling information in a shared visualization environment include receiving a request to initiate a shared visualization session, assigning the requesting client device as the master of the initiated session, and transmitting visualization data to the client device for rendering and display. Additional client devices may join the visualization session and may display the visualization data based on attributes controlled by the master client device. Data displayed in a visualization session may include two- and three-dimensional data representing a composite wellbore derived from actual and planned wellbore data. Generation of the two- and three-dimensional data may include projecting data corresponding to the composite wellbore onto flat and curved planes and may further include supplementing the composite wellbore data with seismic and other drilling-related data.

28 Claims, 18 Drawing Sheets

Related U.S. Application Data

(60) Provisional application No. 62/250,256, filed on Nov. 3, 2015, provisional application No. 62/376,256, filed on Aug. 17, 2016, provisional application No. 62/367,538, filed on Jul. 27, 2016, provisional application No. 62/376,270, filed on Aug. 17, 2016, provisional application No. 62/408,585, filed on Oct. 14, 2016.

(51) Int. Cl.

| | |
|---|---|
| *G06T 19/20* | (2011.01) |
| *G06T 7/60* | (2017.01) |
| *E21B 47/09* | (2012.01) |
| *E21B 44/00* | (2006.01) |
| *E21B 47/024* | (2006.01) |
| *E21B 49/00* | (2006.01) |
| *E21B 47/00* | (2012.01) |
| *G06F 3/0481* | (2013.01) |

(52) U.S. Cl.
CPC .............. *G06F 3/1454* (2013.01); *G06T 7/60* (2013.01); *G06T 19/20* (2013.01); *E21B 47/00* (2013.01); *E21B 49/00* (2013.01); *E21B 2200/22* (2020.05); *G06F 3/04815* (2013.01); *G06T 2207/20101* (2013.01); *G06T 2210/21* (2013.01); *G06T 2219/2012* (2013.01)

(58) Field of Classification Search
CPC ............. G06T 2219/2012; E21B 44/00; E21B 47/024; E21B 47/09; E21B 47/00; E21B 49/00; E21B 2041/0028; G06F 3/1454; G06F 3/04815
USPC .......................................................... 703/10
See application file for complete search history.

(56) References Cited

U.S. PATENT DOCUMENTS

| | | |
|---|---|---|
| 4,443,762 A | 4/1984 | Kuckes |
| 4,700,142 A | 10/1987 | Kuckes |
| 4,957,172 A | 9/1990 | Patton |
| 5,074,365 A | 12/1991 | Kuckes |
| 5,103,920 A | 4/1992 | Patton |
| 5,131,477 A | 7/1992 | Stagg |
| 5,485,089 A | 1/1996 | Kuckes |
| 5,495,174 A | 2/1996 | Rao |
| 5,589,775 A | 12/1996 | Kuckes |
| 5,675,488 A | 10/1997 | McElhinney |
| 5,678,643 A | 10/1997 | Robbins |
| 5,812,068 A | 9/1998 | Wisler |
| 5,842,149 A | 11/1998 | Harrell |
| 5,899,958 A | 5/1999 | Dowell |
| 5,901,795 A | 5/1999 | Tsao |
| 6,073,079 A | 6/2000 | Thomas |
| 6,233,524 B1 | 5/2001 | Harrell |
| 6,530,154 B2 | 3/2003 | Towle |
| 6,736,221 B2 | 5/2004 | Chia |
| 6,834,732 B2 | 12/2004 | Haarstad |
| 6,927,741 B2 | 8/2005 | Brune |
| 6,968,909 B2 | 11/2005 | Aldred |
| 6,985,814 B2 | 1/2006 | McElhinney |
| 7,003,439 B2* | 2/2006 | Aldred .................... E21B 44/00 703/10 |
| 7,209,834 B2 | 4/2007 | El Askary |
| 7,359,844 B2* | 4/2008 | Sung ...................... E21B 49/00 703/10 |
| 7,546,209 B2 | 6/2009 | Williams |
| 7,599,797 B2 | 10/2009 | Poedjono |
| 7,703,548 B2 | 4/2010 | Clark |
| 7,886,844 B2 | 2/2011 | Phillips |
| 8,010,290 B2 | 8/2011 | Illfelder |
| 8,011,451 B2 | 9/2011 | MacDonald |
| 8,463,550 B1 | 6/2013 | Selman |
| 8,676,558 B2 | 3/2014 | Pirovolou |
| 8,684,107 B2 | 4/2014 | Clark |
| 8,768,672 B2* | 7/2014 | Hsu ........................ G01V 1/282 703/10 |
| 8,827,005 B2 | 9/2014 | Morley |
| 9,540,879 B2 | 1/2017 | Kolpack |
| 9,625,605 B2 | 4/2017 | San Martin |
| 9,990,588 B2* | 6/2018 | Tanuma .................. G06Q 50/02 |
| 10,101,498 B2* | 10/2018 | Berard ................. G01V 99/005 |
| 2003/0014873 A1 | 1/2003 | Towle |
| 2003/0085059 A1 | 5/2003 | Kuckes |
| 2005/0171698 A1 | 8/2005 | Sung |
| 2005/0209866 A1* | 9/2005 | Veeningen .............. G06Q 10/06 705/7.28 |
| 2006/0074561 A1 | 4/2006 | Xia |
| 2007/0126426 A1 | 6/2007 | Clark |
| 2007/0278008 A1 | 12/2007 | Kuckes |
| 2008/0041626 A1 | 2/2008 | Clark |
| 2008/0289877 A1 | 11/2008 | Nikolakis-Mouchas |
| 2009/0000823 A1 | 1/2009 | Pirovolou |
| 2009/0152005 A1* | 6/2009 | Chapman ................. E21B 7/00 175/24 |
| 2009/0157367 A1* | 6/2009 | Meyer ...................... E21B 7/04 703/10 |
| 2010/0114544 A1* | 5/2010 | Dogru ..................... E21B 49/00 703/10 |
| 2010/0169018 A1 | 7/2010 | Brooks |
| 2010/0175922 A1 | 7/2010 | Ignova |
| 2011/0166843 A1* | 7/2011 | Hsu ........................ G01V 11/00 703/10 |
| 2013/0161096 A1 | 6/2013 | Benson |
| 2013/0173164 A1 | 7/2013 | Zhang |
| 2013/0206397 A1 | 8/2013 | Georgi |
| 2013/0226461 A1 | 8/2013 | Yu |
| 2015/0019134 A1 | 1/2015 | Sawaryn |
| 2015/0233229 A1 | 8/2015 | Benson |
| 2016/0090822 A1 | 3/2016 | Lu |
| 2016/0194951 A1 | 7/2016 | Hay |
| 2016/0258273 A1 | 9/2016 | Hou |
| 2016/0273314 A1* | 9/2016 | Tanuma .................. G06Q 50/02 |
| 2016/0273344 A1 | 9/2016 | Wu |
| 2017/0009566 A1 | 1/2017 | Fan |
| 2017/0074087 A1 | 3/2017 | Donderici |
| 2017/0122095 A1 | 5/2017 | Flanagan |

OTHER PUBLICATIONS

Harry Hodgson and S.G. Varnado, Computerized Well Planning for Directional Wells, SPE 12071, Oct. 5-8, 1983. (Year: 1983).*

* cited by examiner

SYSTEMS AND METHODS FOR SHARED VISUALIZATION AND DISPLAY OF DRILLING INFORMATION

CROSS-REFERENCE TO RELATED APPLICATIONS

This application is a continuation-in-part of U.S. application Ser. No. 15/343,007 filed Nov. 3, 2016, titled "Automated Geo-Target and Geo-Hazard Notifications for Drilling Systems," which claims the benefit of priority under 35 U.S.C. § 119(e) to provisional application No. 62/250,256 titled "Shared Visualization with Automated Depth Model Based Notifications for Drilling Systems Utilizing 3D Seismic Data," filed on Nov. 3, 2015, and provisional application No. 62/376,256 titled "Automated Geo-Target and Geo-Hazard Notifications for Drilling Systems," filed on Aug. 17, 2016, which are hereby incorporated by reference herein. This application further claims priority under 35 U.S.C. § 119(e) to provisional application No. 62/367,538 titled "Shared Visualization and Automated Geo-Target and Geo-Hazard Notification for Drilling Systems Utilizing 3D Seismic Data," filed Jul. 27, 2016, and provisional application No. 62/376,270 titled "Shared Visualization and Automated Geo-Target and Geo-Hazard Notifications for Drilling Systems," filed Aug. 17, 2016, and provisional patent application No. 62/408,585 titled "System and Method for Generating and Displaying Three Dimensional and Two Dimensional Drilling Information," filed Oct. 14, 2016.

TECHNICAL FIELD

The present technology pertains to drilling systems, and more specifically pertains to shared visualization and display of drilling information.

BACKGROUND

An oil company asset team must work to together to ensure the efficient drilling and completion of an oil and gas well. During the years 2005 through 2016, the drilling of horizontal wells in shale formations became a very important new regime of operations for the oil industry. This new regime requires a "factory floor" mindset whereby activities become repetitive and must be repeatable in order to ensure optimal outcomes from an economic perspective.

In order to drill a successful horizontal well, a cross-functional team (a.k.a. "asset team") comprised of engineers, geoscientists, regulatory, financial specialists, managers, and third party service providers, such as the drilling contractor and mud-logger, must work together. The asset team must collaborate to plan the well, execute the drilling plan, avoid geo-hazards, and stay on an optimal drilling track and on the drilling plan. This is challenging since the drilling target geologic horizon will typically be 2 miles underground and located in a remote field area.

An increasingly important tool for improving the success of these horizontal shale drilling projects is 3-dimensional seismic data (3D seismic). Many oil and gas companies will acquire a 3D seismic survey that is an image of the subsurface region within which they intend to drill. This seismic survey will be calibrated to existing well control and converted into depth (meaning the z-axis of the seismic volume will readout in depth below the surface). The target horizon (and potentially additional reference horizons) along which the horizontal well will be drilled is identified within the seismic volume, along with potential hazards, which primarily will be geologic faults that intersect the target horizon, but which will also include pre-existing wellbores within the vicinity. In addition, mineral lease ownership information could be included in the depth model. Also, the depth model typically includes a planned drilling wellbore trajectory. This information is collectively referred to as the "Depth Model."

As the drilling of the well proceeds, the location of the drill-bit using measurement while drilling (MWD) information can be transmitted on a periodic (15 minute or other interval), real-time basis to the oil company. Not uncommonly, an asset team member (typically a geoscientist) will be assigned to manually update a set of project information on an at least a once daily basis—the project contains the seismic volume, the depth model including geo-hazards, and the path of the well being drilled. This permits the geoscientist to determine whether an exceptional condition is imminent. The geoscientist assigned to this duty will manually prepare a daily report that includes the seismic imagery, the depth model, and the current well drill bit position, along with notes containing an analysis of the exceptional conditions. This report is then distributed manually to the other asset team members to help the asset team work together. Regardless, the process is labor intensive, not typically real-time, the information is difficult to distribute and coordinate particularly from remote locations where team members are remote from the drilling operations, among numerous other challenges and deficiencies.

SUMMARY

Systems and methods for shared visualization of drilling data are provided. Such systems and methods include receiving, at a server of a drilling management system, a visualization request from a first client device to initiate a shared visualization session of a drilling site. The server, which is communicatively coupled to a data source containing visualization data for the drilling site, may then assign the first client device as a master for the shared visualization session, enabling the first client device to adjust attributes for viewing the visualization data of the drilling site. The visualization data is then transmitted to the first client device which renders the visualization data according to the attributes.

A second client device may subsequently request and join the visualization session as a slave device. As such, the second client device may view the visualization data in accordance with the attributes set by the first client device but is generally unable to modify the attributes. In certain implementations, the second client device may request to be assigned as a temporary master, and, if so assigned, may then submit commands to modify the attributes governing viewing of the visualization data by other client devices participating in the shared visualization session.

Systems and methods for generating well drilling information are also provided. In such systems and methods, planned wellbore data and actual wellbore data obtained from a drilling data feed are combined to generate composite wellbore data. The composite wellbore data may then be projected onto a three-dimensional well cross section, which is a curved vertical defined along the composite wellbore. The three-dimensional well cross section may be supplemented with additional data, such as seismic data, indicating geological features or other points of interest and updated in response to receiving new data from a drilling data feed.

In certain implementations, a two-dimensional well vertical section may also be generated by projecting the composite wellbore data onto a two-dimensional plane defined between an origin of the planned wellbore and a specified azimuth. Additional information, such as intersections between the composite wellbore and geological features, may also be projected onto the well vertical section. The vertical well section and the three-dimensional well cross section may be displayed using a two dimensionally referenced user interface and three dimensionally referenced user interface, respectively. In certain implementations, a user may be able to switch between such interfaces and corresponding views of the composite wellbore data.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
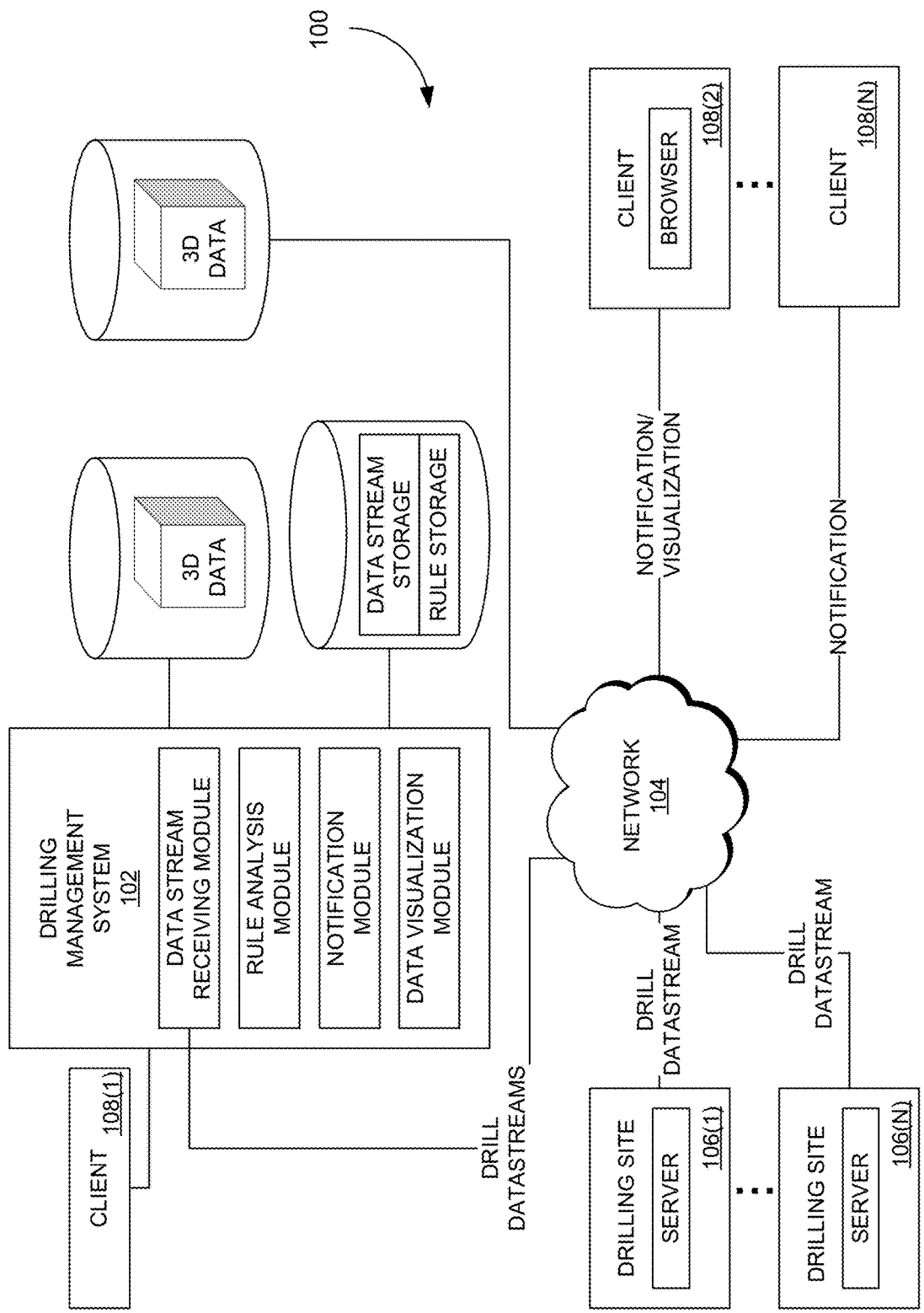
FIG. 1 illustrates an exemplary system for automated geo-target and geo-hazard notifications for drilling systems.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for automated geo-target and geo-hazard notifications for drilling systems. A drilling management system can monitor the traversed path of a drill bit throughout active drilling at a drilling site and notify appropriate team members regarding a current status of the active drilling in real-time. As used herein, the term real-time recognizes that there are various steps and operations that must occur prior to the system receiving information about the location of the wellbore, and the system may be configured to monitor the system based on the most current drill bit information but may be configured to provide notifications on some schedule. For example, some time may pass between transmission of drill bit information from the well to the system and hence the term real-time recognizes some time may pass between when the drill bit reaches some location and when the system obtains the information as to the current location of the drill bit, and hence the term real-time captures near real-time values (e.g., while drilling and within 10 minutes of the drill bit reaching some point in the drilling operation). With respect to notification, for example, the drilling management system can notify team members when predetermined milestones have been met, when the drill bit is drifting off course from a target wellbore trajectory and/or target horizon, or when the drill bit is in danger of running into a geo-hazard, such as a pre-existing wellbore, unpierced fault plane, lease boundary, etc. The drilling management system can maintain a depth model of the drilling site that identifies the target wellbore trajectory and coordinates of known geo-hazards at the drilling sites. The drilling management system can also maintain a set of rules for each of the drilling sites that indicate when team members should be notified.

While an active drill is in progress at a drilling site, the drilling management system can receive a drilling data stream (e.g., a stream of data generated from MWD data captured from an MWD tool) from the drilling site that includes coordinate data describing a traversed path of a drill bit. The drilling management system can determine, based on the coordinate data and the depth model of the drilling site, whether a rule has been triggered indicating that one or more team members should be notified regarding the status of the active drill. In response to determining that the rule has been triggered, the drilling management system can identify a set of team members that should be notified, and transmit a notification to the team members that the rule has been triggered.

The disclosed technology further provides enhanced capabilities for collaboration between asset team members. In a first aspect, systems and methods for shared visualization of drilling information is provided. The systems and methods enable asset team members operating various of client devices to access and view drilling information accessible to the drilling management system. Client devices may access the drilling information through a web browser or similar application which obtains and renders the data for viewing by a user of the respective client device. Users are also able to participate in shared visualization sessions with other asset team members. During such shared visualization sessions, one client device may be designated as a master client device and, as the master client device, may be able to control the viewing attributes of all client devices in participating in the shared visualization session.

In another aspect of the present disclosure, a method of generating and presenting drilling information in various formats is provided. The method includes generating composite wellbore data for a given well by combining actual wellbore data obtained during drilling of the well with planned wellbore data for any portion of the well yet to be drilled. The composite wellbore data may then be projected onto a 3D well cross section or a vertical section and displayed through a 3D or 2D user interface, respectively. The displayed data may also include additional information including geological formation data, seismic image data, and points of interest identified by users. Users may also readily change between 3D and 2D representations of the wellbore data to facilitate communication and understanding between asset team members that conventionally interpret well data in 3D (such as geoscientists) and those that conventionally work with 2D representations (such as drilling engineers and technicians).

FIG. 1 illustrates an exemplary system for automated geo-target and geo-hazard notifications for drilling systems. As illustrated, multiple computing devices can be connected to a communication network 104 and be configured to communicate with each other through use of the communication network 104. The communication network 104 can be any type of network, including a local area network ("LAN"), such as an intranet, a wide area network ("WAN"), such as the Internet, or any combination thereof. Further, the communication network 104 can be a public network, a private network, or a combination thereof. The communication network 104 can also be implemented using any number of communication links associated with one or more service providers, including one or more wired communication links, one or more wireless communication links, or any combination thereof, and may support the transmission of data formatted using any number of protocols, as well as different protocols as data traverses the various paths between devices.

A computing device, which may be involved in obtaining and transmitting drilling information, the drilling management system, and the client devices, can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 500 of FIGS. 5A and 5B.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As shown, the overall system 100 includes a drilling management system 102, drilling sites 106(1), 106(2), . . . , 106(N) (collectively "106"), and more particularly computing devices at subsites and client devices 108(1), 108(2), . . . , 108(N) (collectively "108"). The drilling management system 102 can be comprised of one or more computing devices configured to monitor the traversed path of a drill bit throughout active drilling at any drilling sites 106, through receiving drilling information (e.g., MWD of the based information), and communicate with various client devices 108 to notify associated team members regarding the status of active drilling at the drilling sites 106 in real-time.

The drilling sites 106 can be physical drilling sites equipped with drilling machinery, and accompanying sensors and computing devices, such as an MWD component associated with a drill bit, configured to gather drilling data describing the status of an active drilling operation at a drilling site 106. For example, the drilling data, in the form of MWD data, may be delivered in the form of sets of Azimuth (inclination from North), Inclination (dip in degrees), and MD (measured length along wellbore). The data may be converted to x, y, z axis values using any industry standard conversion. The conversion may occur prior to the drilling data transmitting (e.g., the drilling stream) to the drilling management system. Hence, the drilling data can include coordinate data, such as an x-axis value, y-axis value and z-axis value, describing the location of a drill bit as the drill traverses through the ground during the active drill. Systems at the drilling sites 106 can gather and transmit this drilling data to drilling management system 102 as part of a drilling data stream. For example, drilling sites 106 can gather and transmit drilling data to drilling management system 102 every 10 seconds, 30 second, 1 minute, 5 minutes, etc. In one specific example, MWD drill bit positional data is collected by an MWD tool associated with the drill string and typically positioned behind the drill bit. As introduced above, the MWD tool measures Azimuth, Inclination, and length along the well drilling string in real-time. The tool transmits the data to the surface using "mud pulses"—digital pulses sent through drilling fluid, in the wellbore, to the surface where the pulses are encoded with positional data as well as other information. A transducer at the surface converts these pulses back into digital information on a network on the drilling rig. The MWD data may be then be translated to x, y, and z values at a local computing device and transmitted, such as form a private web server at the drilling site, to the drilling management system using the WITSML protocol.

In addition to coordinate data describing the location of a drill bit, drilling data can also include additional data describing an active drill. For example, the drilling data can include identifying data, such as a unique identifier identifying the originating drilling site 106, identifiers of equipment used for drilling, such as the drill bit, sensors, computing devices, etc. The drilling data can also include time stamp values indicating the time at which coordinate values for an active drill were recorded. Drilling data can also include other sensor readings or data gathered during the active drill, such as sensor readings describing traversed soil densities, drill bit pressures, drill bit performance, etc. The drilling data may also include logging while drilling (LWD) data including Gamma Ray Log information. The Gamma Ray log records the intensity of naturally occurring gamma radiation from rock.

The drilling management system 102 can receive drilling data streams from one or more of the drilling sites 106 and analyze the drilling data to determine whether team members associated with the active drill should be notified regarding the status of the active drill. For example, the drilling management system 102 can notify team members when predetermined milestones have been met, when the drill bit is drifting off course from a target wellbore trajectory or when the drill bit is in danger of running into a geo-hazard, such as a pre-existing wellbore, unpierced fault plane, lease boundary, etc.

To accomplish this, the drilling management system 102 can access a depth model for the area being drilled at each drilling site 106, the depth model may identify the target wellbore trajectory for the drilling site 106, coordinates of known geo-hazards. Generally speaking, the depth model is derived from the seismic data for the area to be drilled at the drilling site. Typically, seismic interpretation programs are used to digitize x, y, z coordinate data for a set of seismic data. The digitized coordinates represent and constitute a 3D dimensional surface. Likewise, features identified within the seismic data may be digitized into unique three dimensional surfaces to form part of the depth model. For example, geologic faults, hazards, target horizons or boundaries and the like may be digitized into three dimensional surfaces representative of the respective features. Each data type (the seismic data and the derived horizon and fault surfaces) and the well data (the MWD and LWD information) has its own elevation datum). To align the various data sets used for comparison purposes and to trigger notifications, and the like, the elevation datum may be reconciled if necessary. For example, if the seismic data used to generate the seismic cube has a datum elevation of 5200 ft above sea level, and the drilling data has a datum elevation of 5250 feet above sea level, the depths between the two sets of data can be reconciled by adding 50 ft to the seismic data. The depth model may be based on seismic data for the area being drilled, and may be arranged in a cube with x (e.g., inline), y (e.g., crossline) and/or z (e.g., time or depth) aspects of the cube.

The drilling management system 102 can also maintain a set of rules for each drilling site 106 that indicates when team members for the drilling site 106 should be notified regarding the status of the active drill. For example, the rules can identify milestones that, when met, should be reported to specified team members. As another example, the rules can identify threshold distances from the target wellbore trajectory, the target horizons, and/or geo-hazards that, when met or exceeded, are reported to a specified team member or members. The drilling management system 102 can use the drilling data received from a drilling site 106, along with the corresponding depth model and set of rules, to determine when a rule has been triggered and team members should be notified regarding the status of the active drilling operation.

The drilling management system 102 can notify team members via client devices 108. Client devices 108 can be any type of computing devices, such as a smart phones, laptop computers, desktop computers, tablets, etc. Drilling management system 102 can maintain records of client devices 108 associated with team members, including contact information to reach team members via one or more of client devices 108. In response to determining that a team member should be notified, drilling management system 102 can identify the team members contact information and transmit a notification to the user, which can be received by the user at one or more of client devices 108. For example, drilling management system 102 can transmit the notification as an e-mail, text message, phone call, instant message, etc.

Drilling management system 102 can also provide team members with a visualization of an active drill. For example, drilling management system 102 may use techniques such as those described in U.S. Pat. No. 9,182,913 (the "'913 Patent") titled "Apparatus, System an Method for the Efficient Storage and Retrieval of 3-Dimensionally Organized Data in Cloud Based Computing Architectures," which is hereby incorporated by reference, to among other things, store, access, and view 3D seismic data and depth models within a cloud architecture utilizing a web browser or other client side application. The method disclosed in the '913 Patent also provides for the efficient access to the depth model over network connections.

Team members can use client devices 108 to communicate with drilling management system 102 to request a visualization of an active drill. In response, drilling management system 102 can transmit visualization data to the team member's client device 108. The visualization data can be rendered by client device 108, for example in a web browser or other client-side application, to present the user with a visualization of an active drill. This can include a 2 or 3 dimensional rendering of the drilling site including a visual representation of the traversed path of the drill bit, the target wellbore trajectory, target horizon, and geo-hazard, such as a pre-existing wellbores, unpierced fault planes, lease boundaries, etc.

Figure 2:
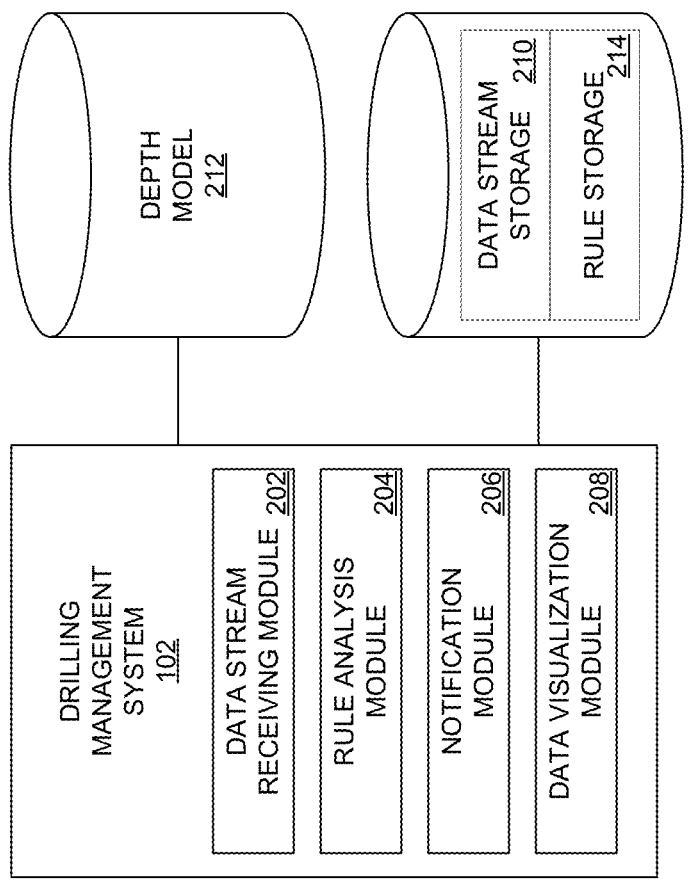
FIG. 2 illustrates an exemplary system embodiment of a drilling management system.

FIG. 2 illustrates an exemplary system embodiment of a drilling management system 102. FIG. 2 is described in view of the system and components described in FIG. 1. As shown, the drilling management system 102 includes a data stream receiving module 202, a rule analysis module 204, a notification module 206, a data visualization module 208, a data stream storage 210, a depth model storage 212 and a rules storage 214. The various modules may involve a processor (or processors) and computer executable instructions to receive the data stream, apply one or more rules to the data stream, and provide notifications as needed. The storage may be provided by one or more tangible readable media, provided as a database or databases, where data from the data stream is stored, the depth model is stored, and rules are stored.

The data stream receiving module 202 receives drilling data streams from one or more drilling sites 106. A drilling data stream can include drilling data describing an active drill. In one possible example, the data stream is accessed from a server or other computing device at the respective well and may be formatted according to the Wellsite Information Transfer Standard Markup Language (WITSML) standard. The data stream may be received at the drilling management system and/or the data stream storage over the network 104. The data stream receiving module 202 can receive and store the received drilling data in the data stream storage 210. The data stream storage 210 can include a data stream index for one or more of the drilling sites 106. The drilling index can be a data index, data file, database, data table, etc., that includes a listing of drilling data received from a particular drilling site 106. For example, a drilling index can include a listing of coordinate data describing the location of a drill bit at the drilling site 106, as well as time stamp data, identifying data, etc. As a drilling operation procedure, the data stream will provide updated data as to the progress of the drilling operation and the current location of the drill bit. Accordingly, the drilling index for a drilling site 106 can include data documenting the traversed path of the drill bit at the drilling site 106, as well as other sensor data and metadata describing drilling at the drilling site 106.

Each drilling index can be associated with a unique identifier identifying the corresponding originating drilling site 106. The data stream receiving module 202 can identify the unique identifier included in a received drilling data stream to identify the corresponding drilling index in data stream storage 210 and record the received drilling data in the identified drilling index.

The rule analysis module 204 is configured to analyze received drilling data to determine whether to notify team members regarding the status of an active drill. For example, the rule analysis module 204 can utilize the drilling data along with a depth model and a set of rules corresponding to a drilling site 106 to determine whether a rule has been triggered and team members should be notified.

The depth model storage 212 can store depth models for drilling sites 106 and rule storage 214 can store sets of rules for the drilling sites 106—with rules being unique and/or common to each drilling site. Each depth model and set of rules can be associated with a unique identifier for its corresponding drilling site 106. The rule analysis module 204 utilizes the unique identifier for a drilling site 106 to gather the corresponding drilling index, depth model and set of rules from data stream storage 210, depth model storage 212 and rule storage 214, respectively.

The rule analysis module 204 can then use the gathered data to determine whether a rule has been triggered. Moreover, the rule analysis module 204 can determine whether a rule has been triggered according to a predetermined temporal schedule, such as every 5 seconds, 10 seconds, 1 minute, etc. The rule analysis module 204 can also determine whether a rule has been triggered as updated coordinate data (e.g., relative drill bit location data) is received from a drilling site 106 as part of a drilling data stream.

The set of rules for a drilling site 106 can include any number or type of rules and/or conditions for notifying team members. For example, a set of rules may include a simple temporal milestone rule dictating that team members be notified of the status of an active drill at specified time intervals, such as every 30 seconds, 1 minute, 5 minutes, etc., or according to a specified time schedule. In one example, a user interface (UI) may be accessed through a client service log, where the UI provides access to a set of preconfigured rules. The UI may include fields to activate any given rule well or to set variable for any given rule. The update time may be a variable set through the UI. The rule analysis module 204 can monitor elapsed time during an active drill for each specified temporal milestone.

As another example, a set of rules can include a distance based milestone rule dictating that team members be notified as the drill bit reaches predetermined distance intervals (a variable setable through the UI), such as every 10 feet, 20 feet, 100 feet etc., or according to a specified distance schedule. The rule analysis module 204 can utilize the location data stored in the drilling index to determine the current location of a drill bit as well as the distance traversed by the drill bit during the active drill and determine whether the rule has been triggered.

As another example, a set of rules can include a trajectory deviation rule dictating that team members be notified when the current location of the drill bit deviates beyond a predetermined threshold distance from the target wellbore trajectory and/or the target horizon for the drill bit. Rule analysis module 204 can utilize the location data stored in the drilling index to determine the current location of a drill bit and utilize the depth model to determine the target wellbore trajectory and/or the target horizon. Rule analysis module 204 can then determine the distance between the current location of the drill bit and the target wellbore trajectory and/or target horizon and compare the distance to a threshold distance to determine whether the rule has been triggered.

With respect to the comparing the actual drill bit location to the drilling plan, a distance is computed between a point in three-dimensional space (the x, y, z coordinate for the current location of the drill bit) and the drilling plan, which may be represented by a polyline in three dimensional space (series of points through the 3D space of the depth model). The distance may be resolved into a z-component and an xy-component that is projected onto the well plan vertical plan, which may be defined in the depth model or separate therefrom. In that regard, the system can determine the location of the drill bit relative to plan and provide any suitable notification—e.g., "at 5:30 p.m., the drill bit is 15 feet above the drilling plan, and 10 feet North of the drilling plan".

As another example, a set of rules can include a trajectory deviation rule dictating that team members be notified when an angle of the drill bit relative to the target horizon exceeds a threshold angle deviation from the target horizon. Rule analysis module 204 can utilize the location data stored in the drilling index to determine a direction (i.e., vector direction) of the drill bit and utilize access the target horizon from the depth model. Rule analysis module 204 can then determine an angle deviation of the drill bit from the target horizon and compare the angle deviation to the threshold angle deviation to determine whether the rule has been triggered.

As another example, a set of rules can include a minimum distance rule to a geo-hazard, such as a pre-existing wellbore, unpierced fault plane or lease boundary. Rule analysis module 204 can utilize the location data stored in the drilling index to determine the current location of a drill bit and utilize the depth model to determine the location of a geo-hazard. Rule analysis module 204 can then determine the distance between the current location of the drill bit and the geo-hazard and compare the distance to a threshold distance to determine whether the rule has been triggered. In this example, the computed X, Y, Z position of the drill bit (current and the previous values, which trace out the actual wellbore path) are compared to the location of a fault surface. The fault surface is stored as a triangulated surface in the same X, Y, Z coordinate system as the coordinates of the path of the drill bit. Computational geometry is used to compute the distance between a point in 3D space (e.g., the most recent position of the drill bit) and a surface in 3D space along a direction vector (the direction that the drill bit is heading). The distance is expressed in standard distance units (meters). So, if a threshold distance has been set for proximity to fault surfaces (such as 50 meters, which may be a variable), when that distance is less than or equal to 50, a notification is generated.

With respect to the intersection of the drill bit with a geo-hazard of some sort, the planned wellbore (a polyline in 3D space) indicates approximately where the wellbore is going to be, and the actual wellbore indicates the real-time (near real-time position) of the drill bit. In one example, any fault surface that intersects the planned wellbore may be considered a "geo-hazard". For any such fault surface, the system can compute the distance to the geo-hazard by computing the distance from the current drill bit position to the intersection of the planned wellbore with that fault surface. Furthermore, the system can estimate the time of the intersection occurring by dividing the distance by the current Rate of Penetration of the drilling (expressed by convention as Feet or Meters per Hour), which may be received by the system with the drilling information provided by the MWD system.

Rule analysis module 204 can determined the distance between the current location of the drill bit and another location based on geographic coordinates associated with the two points, such as an x coordinate value, y coordinate value and z coordinate value assigned to drill bit and the other point. In instances where an object is associated with multiple geographic coordinates, such as a target wellbore trajectory, lease boundary, pre-existing wellbore, etc., rule analysis module 204 can determine the shortest distance between the current location of the drill bit and the other location.

In another example, the rule analysis module may compare the current drill bit position to a target horizon or target horizons. The rule analysis module may also compare the drill bit to a range of distances from a target horizon, or may generate a virtual horizon and compare the location of the drill bit to the virtual horizon. In one example, the depth model may include at least one target horizon. The target horizon, may be a surface comprised of x, y, and z coordinate data. The target horizon may be associated with the top surface, bottom surface or some other surface associated with a formation identified in the seismic data cube from which the depth model is based. For example, a shale bearing formation may be identified in a seismic data set, and a target horizon may be generated and stored for a surface representing the top surface of the formation.

Continuing with the example of a shale formation and a horizon defining a surface in the depth model for the top of the formation, during drilling, it may be desired to drill a horizontal well within some distance from the top of the formation. Hence, a rule may be created to compare the current drill bit position with a target horizon, and generate some form of notification when the drill bit deviates some distance, defined in the rule, from the top of the formation. In another example, it is possible to define a second horizon, such as related to the bottom of the shale formation, and define a rule that provides a notification when the drill bit comes within some target distance of either the top or the bottom of the formation.

In yet another example, the system (e.g., the rule module) may generate a virtual horizon. In one example, the virtual horizon may be a surface defined as some set distance from another surface, such as a virtual horizon defined relative to a target horizon in the depth model. The rule may both generate the virtual horizon, and be defined to generate a notification based on the distance of the drill bit from the virtual horizon. In this example, the target horizon is a surface within the depth model, where the surface is based on some corresponding feature in the related seismic data, and the virtual surface is a surface that is generated based on some mathematical relationship to the target horizon. A virtual surface may be useful, for example, when the resolution of the seismic data is insufficient to identify sub features within a formation, but it is believed, based on perhaps other information, that it is useful to target or avoid the sub feature and a virtual surface is generated for the sub feature, and the rule then based on the sub feature.

The notification module 206 is configured to notify team members when a rule has been triggered. Rule analysis module 204 can provide to the notification module 206, when a rule has been triggered, the data identifying the triggered rule. In one example, the UI may include a function for team member contact information is entered. The contact information may include a phone number for an SMS message, an email address, or other information for the form of communication. The team members and contact information may be linked to the drilling site, and whenever a rule is triggered for the drilling site, the team receives a message over the form (or forms) of communication entered in the site.

In response to receiving a notification from the rule analysis module 204 that a rule has been triggered, notification module 206 can identify a set of team members that should be notified. In some embodiments, each rule can identify the corresponding team members that should be notified when the rule has been triggered as well as include contact information for the identified team members, preferred contact method for the team members and/or data that should be provided to the team members. Notification module 206 can use the data in the triggered rule to generate and transmit notification messages to the team members. For example, notification module 204 can transmit the notification messages as text messages, instant messages, e-mails, etc.

Data visualization module 208 can be configured to provide team members with a visualization of an active drill. The visualization of the active drill can be a two- or three-dimensional rendering of the active drill at a drill site 106, including a visual representation of the traversed path of the drill bit, the target wellbore trajectory, target horizon, and geo-hazard, such as a pre-existing wellbores, unpierced fault planes, lease boundaries, etc.

Data visualization module 208 can receive data visualization requests from client devices 108 for a visualization of an active drill. A data visualization request can include data identifying a drilling site 106, such as the unique identifier for the drilling site 106. Data visualization module 208 can use the unique identifier included in the visualization request to identify and gather the corresponding drilling index in data stream storage 210 and depth module in depth model storage 212. Data visualization module 208 can use the gathered data to generate visualization data that can be rendered by client devices 108 to present the visualization of the active drill. Data visualization module 208 can provide the generated visualization data to the requesting client device 108, where it can be rendered for the team member. Data visualization module 208 can continue to provide updated visualization data to client device 108 to update the visualization of the active drill, thereby allowing the team member to view progress of the active drill in real-time.

Figure 3:
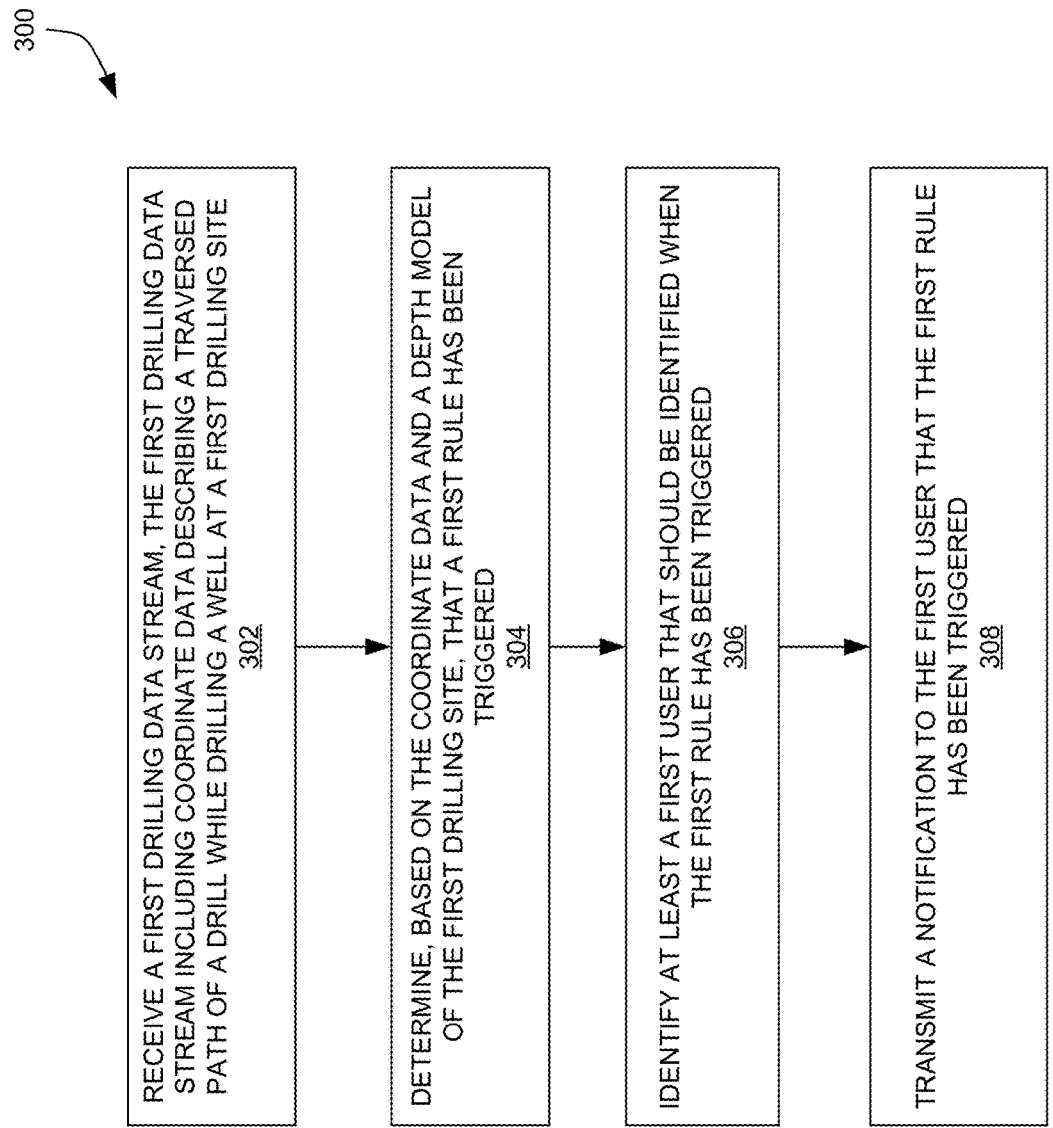
FIG. 3 illustrates an example method of automated geo-target and geo-hazard notifications for drilling systems.

FIG. 3 illustrates an example method 300 of automated geo-target and geo-hazard notifications for drilling systems. It should be understood that there can be additional, fewer, or alternative steps performed in similar or alternative orders, or in parallel, within the scope of the various embodiments unless otherwise stated.

At step 302, a drilling management system can receive a first drilling data stream. The first drilling data stream can include coordinate data describing a traversed path of a drill while drilling a well at a first drilling site. For example, the coordinate data can include an X axis value, a Y axis value and a Z axis value of the drill. The Z axis value can indicate a depth of the drill.

At step 304, the drilling management system can determine, based on the coordinate data and a depth model of the first drilling site, that a first rule has been triggered. The depth model of the first drilling site can identify a target wellbore trajectory for the drill at the first drilling site. For example, the drilling management system can determine, based on the coordinate data, a current location of the drill and a distance between the current location of the drill and the target wellbore trajectory. The drilling management system can then determine that the distance between the current location and the target wellbore trajectory meets or exceeds a threshold distance dictated by the first rule.

At step 306, the drilling management system can identify at least a first user that should be identified when the first rule has been triggered. For example, the first rule can include data identifying the at least a first user that should be identified when the first rule has been triggered.

At step 308, the drilling management system can transmit a notification to the first user that the first rule has been triggered.

Figure 4A:
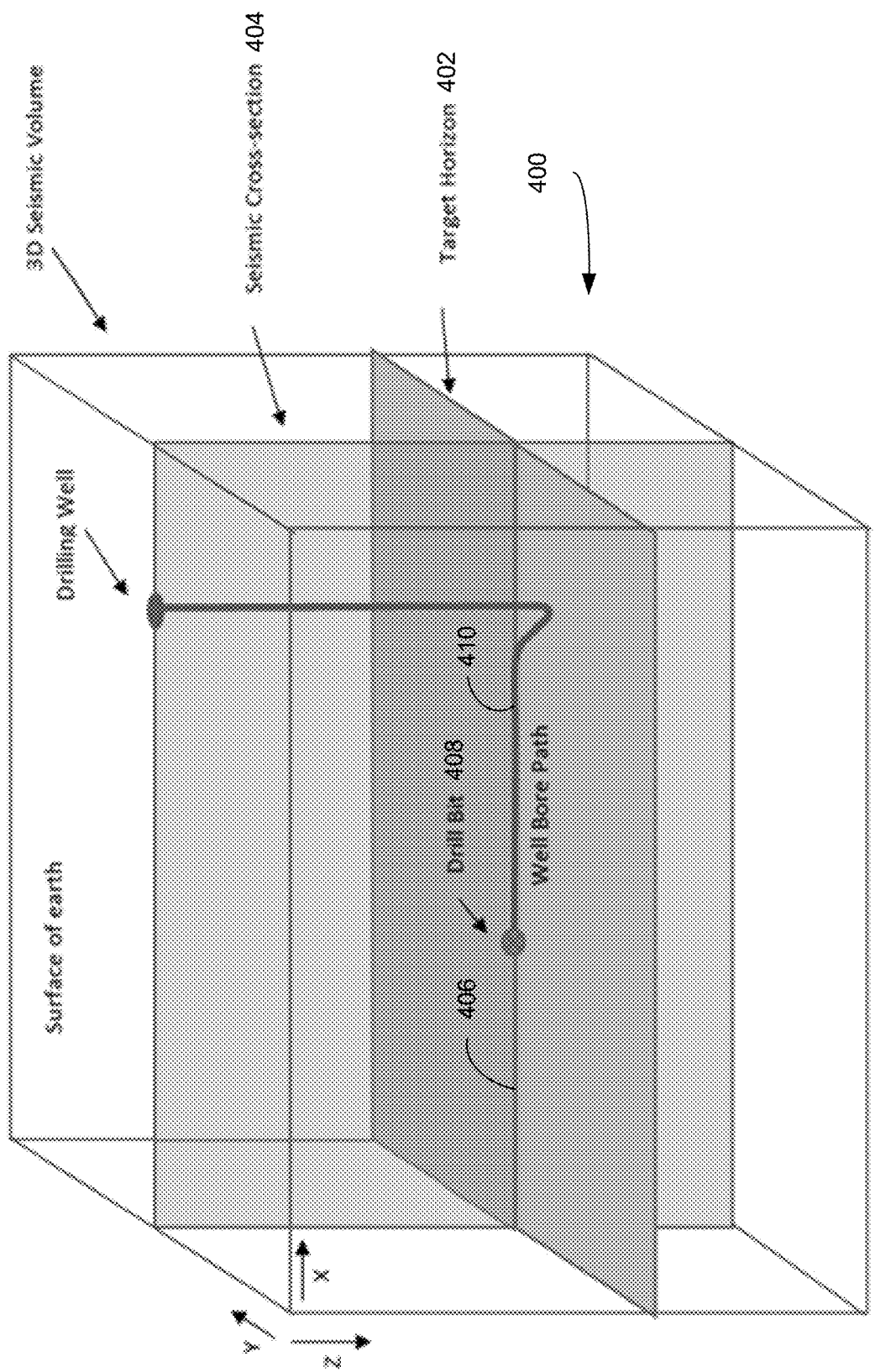
FIGS. 4A-4D illustrate exemplary visualizations of an active drill.

FIGS. 4A-4D illustrate exemplary visualizations of an active drill along with various possible information used by the rule module to generate a notification. The visualization of the active drilling operation depicted in FIG. 4A presents a 3 dimensional representation of a drill site 400 (e.g., 3d seismic volume) including a target horizon 402 and seismic cross-section 404. The intersection of the target horizon and the seismic cross-section represents a target wellbore trajectory 406 of the drill bit. The current location of the drill bit 408 (as obtained from the drill stream data) as well as the traversed path 410 of the drill bit (e.g., wellbore path) is presented relative to the 3d seismic volume, thereby allowing a team member to visually determine whether the drill bit is remaining on the target wellbore trajectory.

Figure 4B:
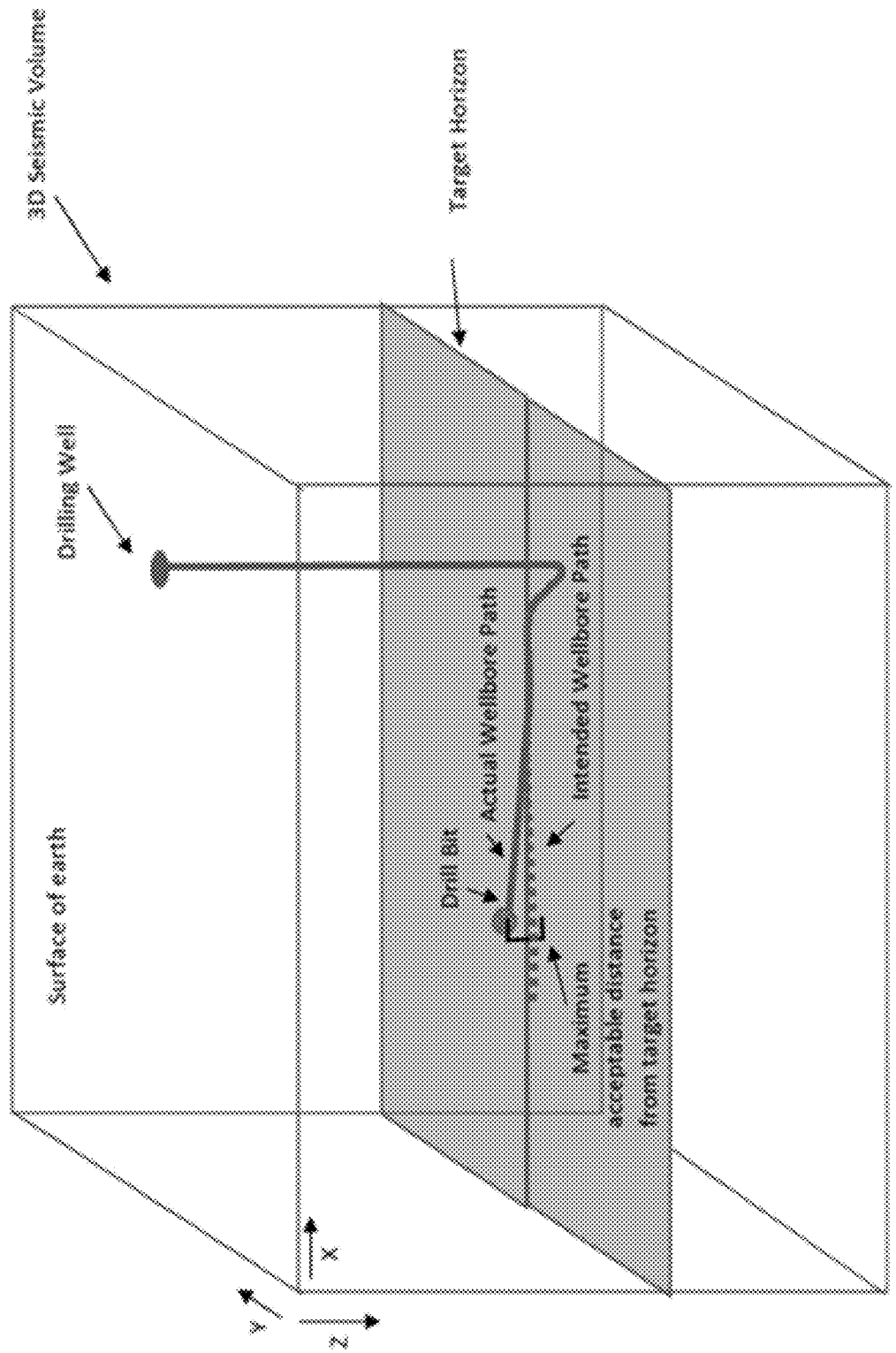

FIG. 4B shows another visualization of an active drill. As show by the drill bit path 410, the drill bit 408 has drifted away from the target wellbore trajectory 406. As mentioned above, the system may provide the visualization through a web browser. Within the browser, an alert (a form of notification) may be posted and a visual cue 412 provided in the viewable seismic cube. For example, a deviation alert in the form of a text box may pop up in the browser window, and a color coded portion of the actual drill path relative to the target trajectory highlighted in some form such as a different color relative to the non-deviated portion of the drill path.

Figure 4C:
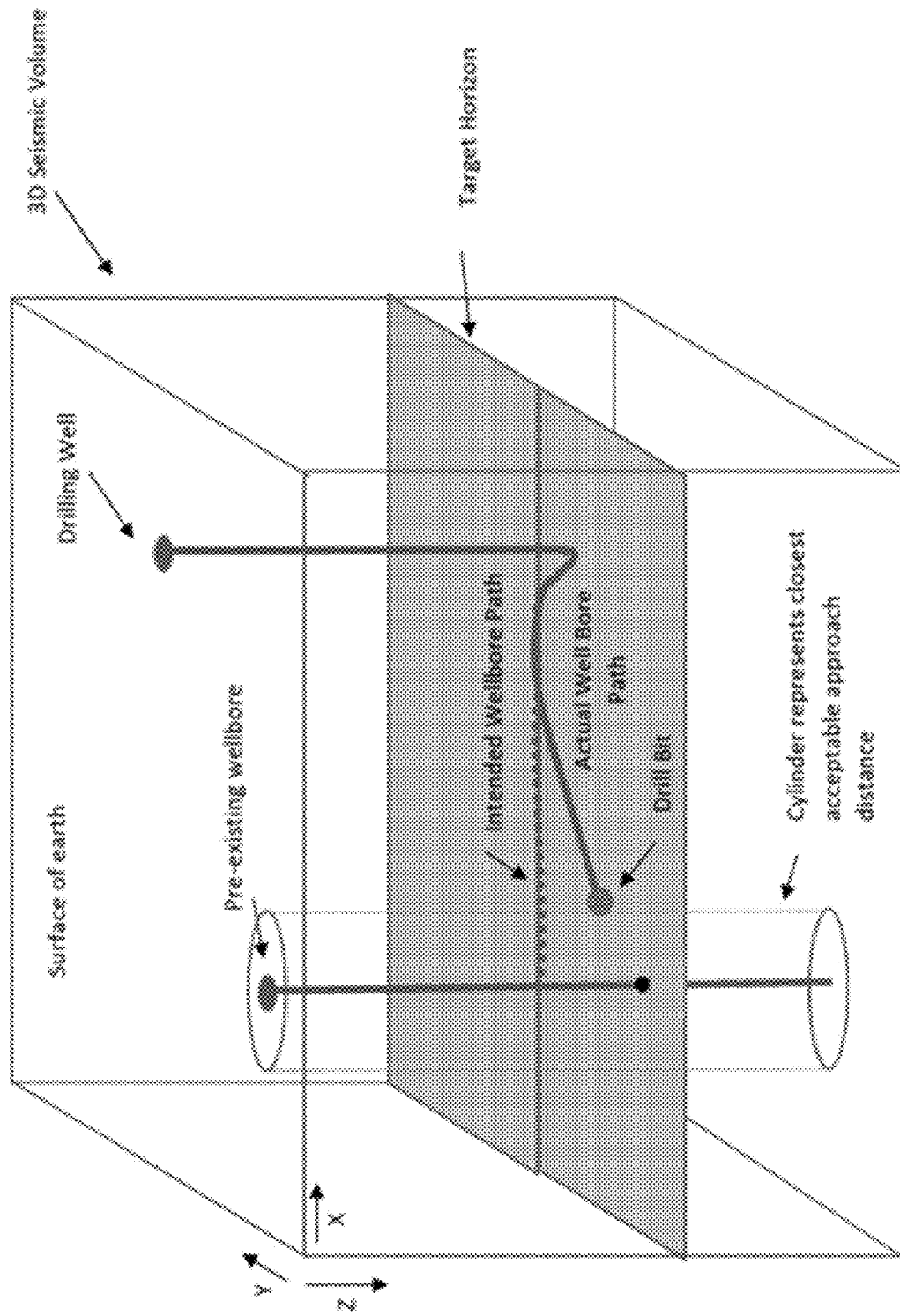

FIG. 4C shows another visualization of an active drill. As shown, the location of a pre-existing wellbore 414 is presented in addition to the traversed path 410 of the drill bit 408 and the target wellbore trajectory 406. Additionally, a minimum threshold distance that the drill must maintain from the pre-existing wellbore is represented as a cylinder 416 surrounding the pre-existing wellbore. The cylinder may be represented in the depth model as a three dimensional surface derived from a radius, of whatever distance needed, around the pre-existing wellbore. For example, a cylindrical x, y, z surface may be generated around the wellbore based on a 50 foot radius. Hence, an alert will be triggered when the current drill bit position intersects any data point of the cylinder defined by the 50 foot radius (e.g., the drill bit gets within 50 feet of a pre-existing wellbore). A team member can view this visualization and easily determine that the drill bit has drifted away from the target wellbore trajectory and is approaching the minimum threshold distance from the pre-existing wellbore.

Figure 4D:
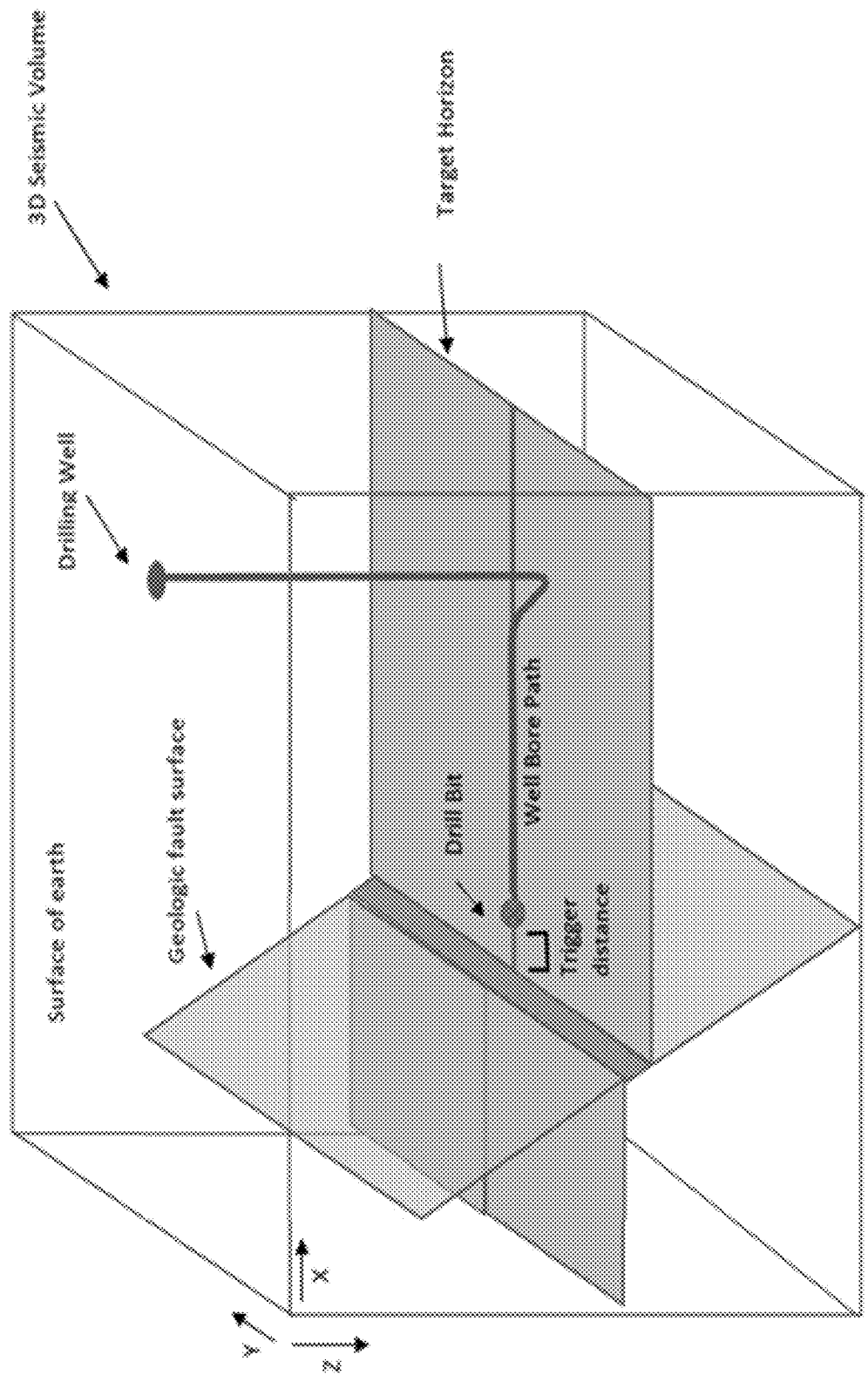

FIG. 4D shows another visualization of an active drill. As shown, the location of a geologic fault surface 418 is show in relation to the traversed path 410 of the drill bit. A team member can view this visualization and easily determine that the drill bit is nearing the geographical fault surface, and a rule may trigger an alert or other notification where the drill bit 408 reaches some distance from the fault. In this example, the geo-hazard 418 may also be color coded for easy differentiation relative to other features.

Shared Visualization of Drilling Information

Drilling operations are a collaborative effort involving multiple members of an asset team. In such work environments, the accurate and efficient sharing of data between members of the asset team may be critical to the overall success and efficiency of a particular project. Accordingly, systems and methods in accordance with the present disclosure enable a collaborative working environment in which drilling information is presented through a visualization environment simultaneously accessible by multiple client devices.

With reference to the system 100 of FIG. 1 and the drilling management system 102 of FIGS. 1 and 2, one of the client devices 108, for example client device 108(1) transmits a request to the drilling management system 102, such as through a web browser or other application, to initiate a shared visualization session. The shared visualization session is then initiated with the requesting client device 108(1) being assigned as the master for the session. Other client devices 108 may then join the visualization session, again through a browser or other application, as "slave" devices. Each of the client devices 108 subsequently receives and displays drilling information from the drilling management system 102. The master client device 108(1) may be used to make adjustments to visualization attributes (such as zoom levels, angles of viewing, etc.) that are then forwarded to the other client devices such that the master client device 108(1) may direct viewing and presentation of the drilling information. In certain implementations, the drilling management system 102 may also allow the master client device 108(1) to temporarily relinquish the master status to one or more of the other client devices 108. The client device to which the master status is relinquished may then be used to modify the visualization attributes.

Figure 5:
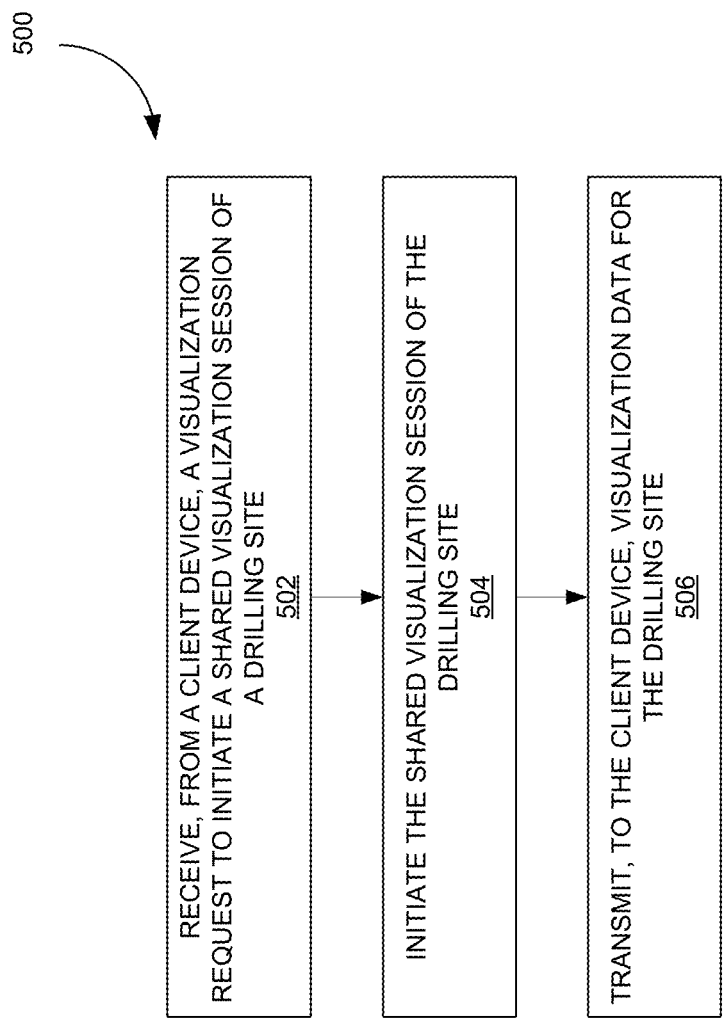
FIG. 5 illustrates an example method of initiating a shared visualization between users of a drilling management system.

FIG. 5 illustrates an example method 500 of initiating a shared visualization session. It should be understood that there can be additional, fewer, or alternative steps performed in similar or alternative orders, or in parallel, within the scope of the various embodiments unless otherwise stated. The following discussions of FIG. 5-8 make additional reference to the system 100 and drilling management system 102 of FIGS. 1 and 2. Such references are intended only to provide context to the following descriptions of the methods illustrated in FIGS. 5-8.

At step 502, a drilling management system 102 can receive a visualization request from a client device, such as client device 108(1), to initiate a shared visualization session of a drilling site. The visualization request can be transmitted as a result of a request to initiate the visualization session using a web browser of other client side application on the client device 108(1).

At step 504, the drilling management system 102 can initiate the shared visualization session of the drilling site. Because the client device 108(1) requested to initiate the shared visualization session, the client device 108(1) is assigned as a master for the shared visualization session and is enabled to adjust attributes for defining a view of the drilling site during the shared visualization session. The drilling management system 102 can mark the initiated shared visualization session with a unique identifier associated with the client device 108(1) to designate that the client device 108(1) is assigned as the master. To initiate the shared visualization session, the drilling management system 102 can initiate a direct communication session with the client device 108(1) using a designated web-socket of the drilling management system 102. The direct communication session can be maintained for the duration of the shared visualization session.

At step 506, the drilling management system 102 can transmit, to the client device 108(1), visualization data for the drilling site. Transmitting the visualization data to the client device 108(1) can cause the client device 108(1) to render the visualization data of the drilling site according to a set of attributes defining a view of the drilling site. The attributes can include any type of attribute such as rotation angles, zoom level, designated visibilities, colors of objects, cursor position, whether to view in 3D or 2D, etc. Once the visualization session has been initiated, additional users of other client devices, such as client devices 108(2)-108(N), can join the shared visualization session as "slave" devices that have limited capabilities with respect to the visualization session. For example, in certain implementations, slave devices are restricted from adjusting attributes for defining a view of the drilling site during the shared visualization session.

Figure 6:
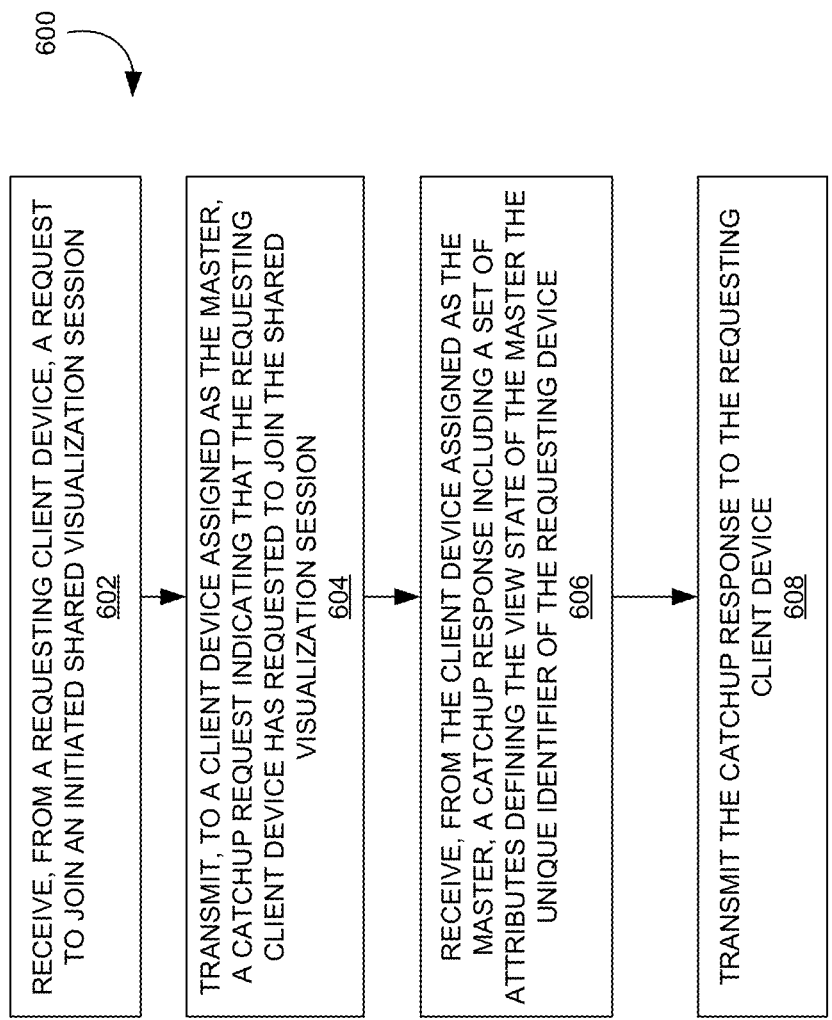
FIG. 6 illustrates an example method of joining a client device with a previously initiated shared visualization session.

FIG. 6 illustrates an example method 600 of adding an additional user to an initiated shared visualization session. It should be understood that there can be additional, fewer, or alternative steps performed in similar or alternative orders, or in parallel, within the scope of the various embodiments unless otherwise stated.

As illustrated in FIG. 1, the system 100 may include a plurality of client devices 108. Each of the client devices, regardless of whether it is designated as a master or slave device, may be capable of transmitting commands to the drilling management system 102 or other client devices 108. To facilitate communication of such commands, each client device 108 may be assigned a unique identifier that may be included with or appended to commands transmitted from the client devices 108. Such identifiers may be used to indicate the source of a command and/or the intended recipient of a command. In certain implementations, commands issued by any of the client devices 108 in the shared visualization session may be transmitted as multicast messages, meaning that the message is sent to and received by each client device 108 participating in the shared visualization session. In certain implementations, for example, commands are first sent to the drilling management system 102 which then forwards the commands to each of the other client devices 108 included in the shared visualization session. The client devices 108 may then decide whether to accept or ignore commands based on, among other things, whether their respective unique identifier is included in the command. Each command may include additional data, such as a command type or name, attribute information, the unique ID of the command sender, etc.

At step 602, the drilling management system 102 receives, from a requesting client device, such as the client device 108(2), a request to join a previously initiated shared visualization session of a drilling site. For example, in certain implementations, the client device 108(2) requests to join an initiated shared visualization session by sending a "catch up" command to the drilling management system 102.

The "catch up" command functions as a request for the current attributes defining the view of the master client device (e.g., the client device 108(1)). The catch up command may be required in implementations in which attributes defining the view of the master client device 108(1) are only transmitted periodically or when a change is made by the master client device 108(1). In such implementations, a client device joining a shared visualization session may not have the same view attributes as the master client device 108(1) and may not be properly updated until a new set of attributes is provided by the drilling management system 102. Accordingly, the catch up command enables a client device joining an initiated visualization session to have its view attributes synchronized with those of the master client device 108(1) and any other client devices 108 in the initiated visualization session.

At step 604, the drilling management system 102 transmits, to the master client 108(1), a catch up request indicating that the requesting client device 108(2) has requested to join the shared visualization session. As explained above, the catch up request is transmitted as a multicast message and will be received by each client device 108 participating in the shared visualization session. While the catch up request will be transmitted to each participating client device 108, it will only be answered by the client device assigned as the master and ignored by the others.

At step 606, the drilling management system 102 receives, from the master client device 108(1), a catch up response including a set of attributes defining the view state of the master client device 108(1) and the unique identifier of the requesting client device 108(2).

At step 608, the drilling management system 102 transmits the catch up response to the requesting client device 108(2). Again, the catch up message will be transmitted as a multicast and be received by all participating client devices 108, but will be ignored by each client device other that the requesting client device 108(2) as identified by the included unique identifier. The requesting client device 108(2) then processes the catch up response, causing the requesting client device 108(2) to render the visualization data of the drilling site according to the set of attributes defining the view state of the master client device 108(1). As a result the view of the requesting client device 108(2) will match that of the master client device 108(1). Upon being added to the shared visualization session, the requesting client device 108(2) will be assigned as a slave, meaning that the requesting client device 108(2) may be restricted from adjusting attributes for defining a view of the drilling site during the shared visualization session. Further, the view of the requesting client device 108(2), like all other client devices other than the master client device 108(1), will be adjusted according to changes made by the master client device 108(1).

Figure 7:
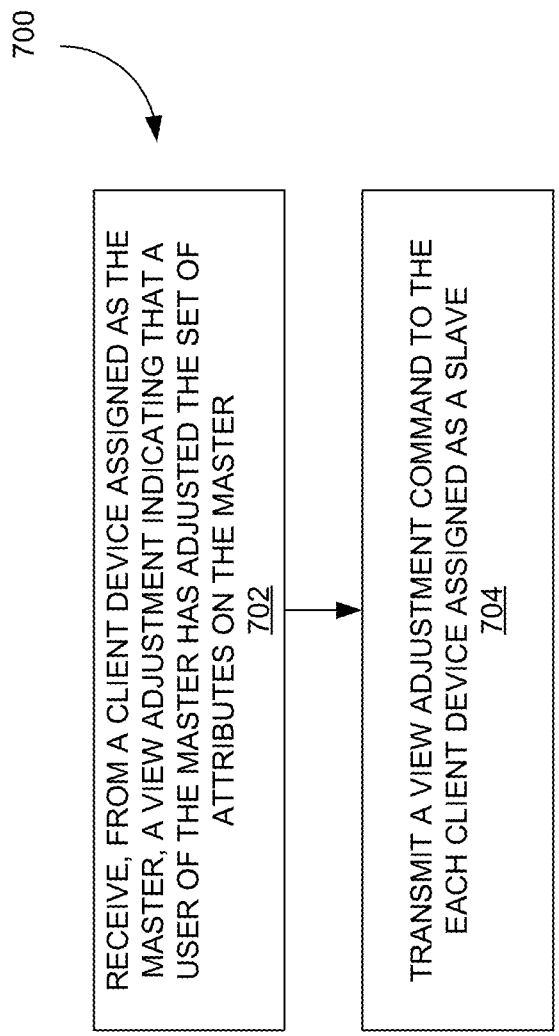
FIG. 7 illustrates an example method of adjusting viewing attributes of a shared visualization session.

FIG. 7 illustrates an example method 700 of synchronizing the view of a master client device (e.g., the client device 108(1)) and a slave client device (e.g., the client device 108(2)) in a shared visualization session. It should be understood that there can be additional, fewer, or alternative steps performed in similar or alternative orders, or in parallel, within the scope of the various embodiments unless otherwise stated.

At block 702, the drilling management system 102 receives, from a master client device 108(1), a view adjustment indicating that a user of the master client device 108(1) has adjusted the set of attributes of the visualization on the master client device 108(1). The view adjustment message can include an updated set of attributes defining the new view state of the master client device 108(1).

At block 704, the drilling management system 102 transmits a view adjustment command to each client device 108(2)-108(N) assigned as a slave. The view adjustment message can include the updated set of attributes defining the new view state of the master client device 108(1). The view adjustment message can be processed by each of the slave client devices 108(2)-108(N), causing each to render the visualization data of the drilling site according to the updated set of attributes defining the new view state of the master client device 108(1).

Figure 8:
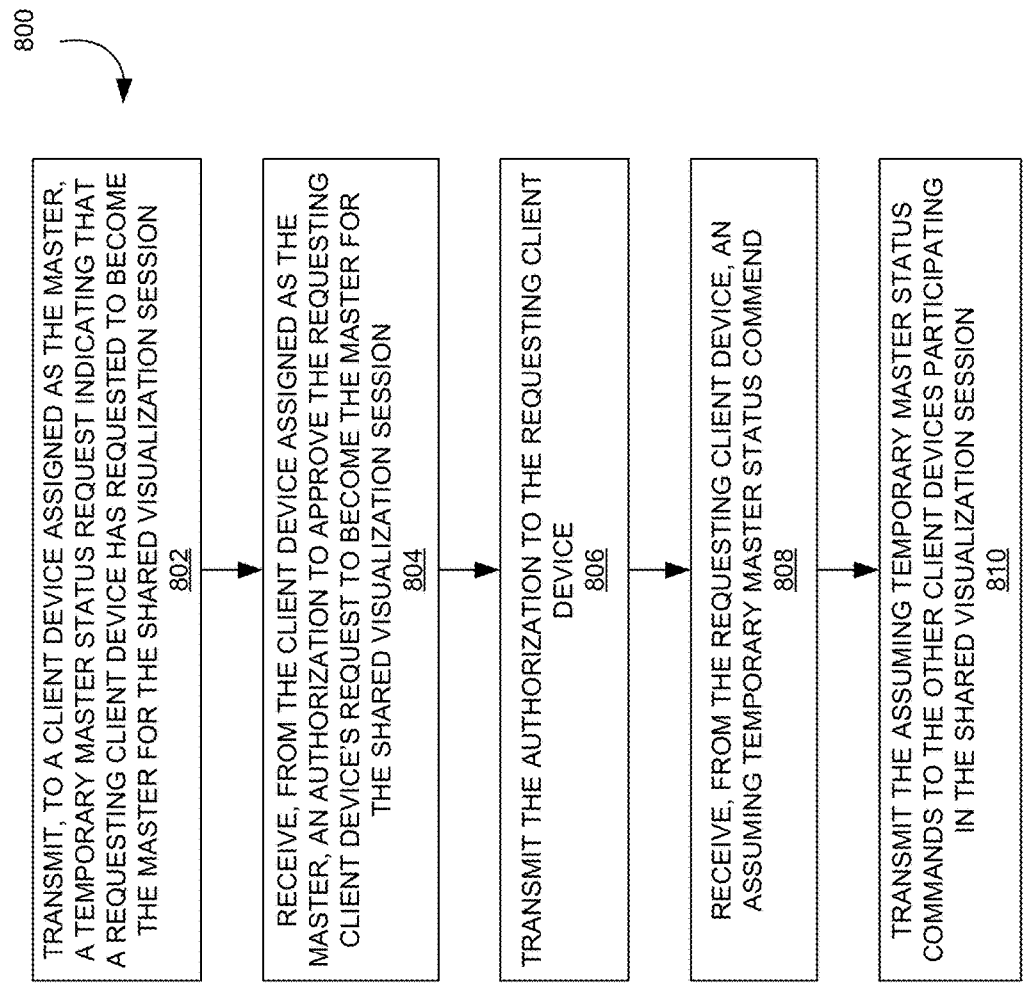
FIG. 8 illustrates an example method of temporarily assigning a client to device as a master of an initiated visualization session.

While a slave client device is restricted from adjusting attributes for defining a view of the drilling site during the shared visualization session, a slave client device can request to temporarily become the master client device. FIG. 8 illustrates an example method 800 of assigning a slave client device to be a temporary master client device in a shared visualization session. It should be understood that there can be additional, fewer, or alternative steps performed in similar or alternative orders, or in parallel, within the scope of the various embodiments unless otherwise stated.

At block 802, a drilling management system 102 transmits, to a master client device 108(1), a temporary master status request indicating that a requesting client device (e.g., the client device 108(2)) has requested to become the master for the shared visualization session.

At block 804, the drilling management system receives, from the master client device 108(1), an authorization to approve the request of the requesting client device 108(2) to become the master for the shared visualization session. The authorization can include the unique identifier for the requesting client device 108(2).

At block 806, the drilling management system 102 transmits the authorization to the requesting client device 108(2). In certain implementations, the authorization is transmitted as a multicast and is received by all participating client devices 108(2)-108(N), but will be ignored by each client device other that the requesting client device 108(2) as identified by the included unique identifier.

At block 808, the drilling management system 102 receives, from the requesting client device 108(2), an assuming temporary master status command, which contains a set of updated attributes as well as the unique identifier of the requesting client device 108(2).

At block 810, the drilling management system 102 transmits the assuming temporary master status commands to the other client devices participating in the shared visualization session, including the master client device 108(1). This can cause the other client devices assigned as slaves and the master client device 108(1) to render the visualization data of the drilling site according to the set of updated attributes received from the requesting client device 108(2). Further, the other client devices can record the unique identifier of the requesting client device as being the temporary master.

When received by the master client device 108(1), the assuming temporary master status command can cause the master client device 108(1) to save its current view state and render the visualization data of the drilling site according to the set of updated attributes received from the requesting client device 108(2) that has been assigned temporary master status.

Moving forward from this point, the requesting client device 108(2) is assigned as the temporary master and changes made to the view state of the temporary master client device 108(2) will be synchronized on the other client devices in the shared visualization session, including the master client device 108(1).

After assigning the requesting client device 108(2) status as the temporary master for the shared visualization session, the drilling management system 102 may receive, from the client device 108(2), a view adjustment indicating that a user of the client device 108(2) has adjusted the view state of the client device 108(2) to yield a new set of attributes defining a second view of the drilling site. In response to receiving the view adjustment, the drilling management system 102 may transmit a view adjustment command to the other client devices participating in the shared visualization session, including the master client device 108(1), causing the other client devices to render the visualization data of the drilling site according to the new set of attributes.

To revert back to control by the original master, the master client device 108(1) may transmit a cancelling temporary master command or, alternatively, the temporary master client device 108(2) may transmit a relinquishing temporary master status command. In response to either command, the temporary master client device 108(2) is reassigned as a slave for the shared visualization session and the status of the master client device 108(1) is restored. Accordingly, the slave client devices again recognize commands from the original master client device 108(1) and update their respective view states accordingly. In certain implementations, the master client device 108(1) may also fully relinquish status as the master of the visualization session to the temporary master client device 108(2) or another client device participating in the initiated visualization session.

In addition to facilitating shared visualization between the client devices 108, the drilling management system 102 may also enable users of the client devices 108 to share other resources including text, image, video, and other files. In certain implementations, for example, the drilling management system 102 may include or otherwise have access to a file repository for use by members of an asset team. The drilling management system 102 may then receive commands and corresponding data from the client devices 108 to create, access, delete, or otherwise modify items in the repository. In some implementations, the repository may include a shared journal or similar log file by members of the asset team to record and share information. Permissions for resources of the repository may vary, for example, certain members may only be granted read access to certain resources while other members may be permitted to add, delete, or otherwise modify the same resources.

Composite Wellbore Visualization 3D seismic viewing is particularly useful for geoscientists, who are trained to and comfortable with thinking about the subsurface of the earth in three dimensions. In contrast, drilling engineers and technicians commonly work in two dimensions. Specifically, wells are conventionally drilled using a display called a "well vertical cross section" (or "vertical section" for short), which is the established means for communication between drilling engineers and technicians. In the case of a horizontal well, the vertical section is a vertical cross section of the earth starting at the surface location of the well that runs along an azimuth (i.e., a clockwise rotation from either true or magnetic North) that points at the proposed toe of the well. Onto this cross section all the elements of the drilling project are provided, including the plan wellbore path, the actual wellbore path, and any other relevant items.

In light of the differences in which geoscientists and engineers and technicians interpret and use data associated with a wellbore, systems and methods in accordance with this disclosure facilitate generation and presentation of drilling data that can be used to readily produce 3D and 2D visualizations of a given wellbore. More specifically, planned wellbore data and actual drilling data are combined to generate composite wellbore data. A 2D composite well vertical section may then be generated by projecting the composite wellbore data onto a vertical section long a specified azimuth. In addition to the composite wellbore data, additional data, such as seismic data which may include geological features or other points of interest may also be included in the 3D and 2D visualizations. The 3D and 2D visualizations may also be selectively displayed on a corresponding 3D or 2D referenced user interface, which may include color coding or other functions for facilitating identification and analysis of the drilling data. Accordingly, techniques for presenting drilling data described herein enable viewing of geoscientific data (e.g., geologic formation surfaces and geologic fault surfaces and seismic imagery) and engineering data (e.g., proposed and actual wellbores) in a flexible way that accommodates practices of and enhanced collaboration between geoscientists, engineers, and technicians.

Data used in generating the previously described visualizations may be collected, stored, and accessed using a drilling management system, such as the drilling management system 102 of FIGS. 1 and 2. Moreover, the 3D and 2D visualizations may be presented to users of the drilling management system 102 through respective client devices 108. Presentation of the 3D and 2D visualizations may occur in a shared visualization environment as previously described in the context of FIGS. 5-8. For example, in certain implementations, visualizations may be accessible to users of the client devices 108 through a browser-based interface, thereby enabling ready access to critical drilling information even in relatively remote operational conditions.

Figure 9:
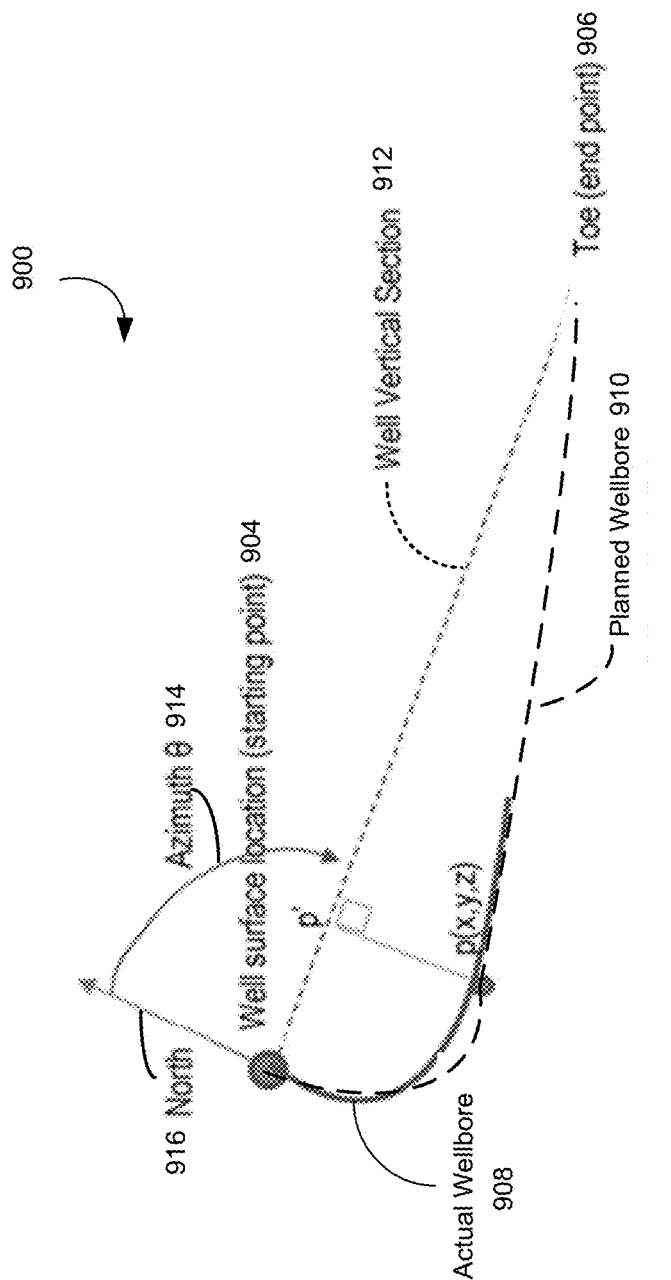
FIG. 9 illustrates a drilling plan.

FIG. 9 is a surface view of a drilling plan 900 for a horizontal well 902 that includes a vertical portion 903 and a horizontal portion 905 (each shown in FIG. 10) between a well surface starting location 904 (i.e., where drilling is initiated) and a toe 906 (i.e., where the horizontal portion of the wellbore terminates). The drilling plan 900 is organized based on a geographical North orientation and includes a planned wellbore that defines the path a drill bit should take between the well surface location 904 and the toe 906. During drilling, a drilling management system, such as the drilling management system 102 of FIG. 1, receives captured drilling information, such as from an MWD tool incorporated into the drill string used to perform the drilling, as the drill proceeds along the wellbore plan. As illustrated in FIG. 9, a solid line 908 is used to represent a portion of the actual drilling path while a dashed line 910 represents a planned wellbore trajectory. As illustrated, the two lines may be coextensive or substantially coextensive such that the actual drilling path 908 tracks or approximates the planned drilling path 910. Nevertheless, some deviation between the planned drilling path 910 and the actual drilling path 908 may occur during the course of drilling operations.

FIG. 9 also includes a top view of a well vertical section 912 (noting that the section is planar and has a depth along a z-axis perpendicular to the view shown in FIG. 9). More specifically, the well vertical section 912 is a plane along the z-axis including each of the well surface starting location 904 and the toe 906. The well vertical section 912 may be described by an azimuth angle (θ) 914 defined relative to a North projection 916 (which may be either true North or magnetic North) from the well surface starting location 904.

Figure 10:
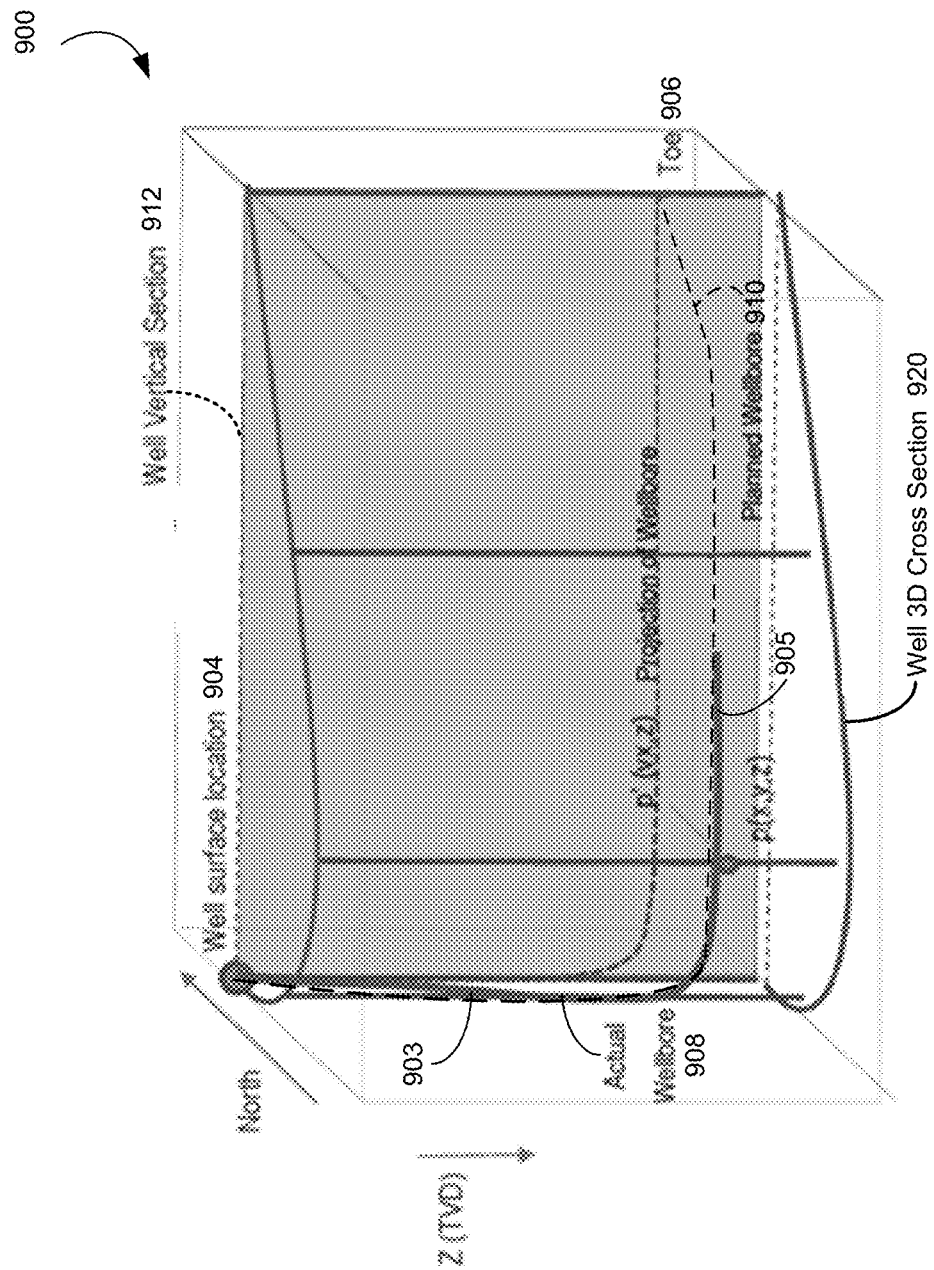
FIG. 10 illustrates an isometric view of the drilling plan of FIG. 9 including a three-dimensional well cross section.

FIG. 10 is an isometric view of a map view of the drilling plan 900 illustrated in FIG. 9. As shown in FIG. 10, the actual wellbore 908 and the planned wellbore 910 define respective subsurface paths that include x-, y-, and z-components. A composite wellbore may generally be defined as a subsurface path including the actual wellbore 908 and any portions of the planned wellbore 910 to be drilled. In general, the z-coordinates referred to herein may also be referred to as "true vertical depth" or "TVD" and are vertical distances below the well's datum (e.g., the surface elevation or kelly bushing elevation).

As previously noted, the composite wellbore includes both plan and actual drilling information. For example, in some implementations, the composite wellbore may be generated by concatenating data corresponding to undrilled portions of the planned wellbore 910 with actual data obtained during the drilling process representing the actual wellbore 908. Notably, the actual drilling data on which the composite wellbore is based may be constantly changing as drilling of the well proceeds. As a result, during a drilling operation, the composite wellbore may be constantly refreshed to reflect any updated drilling information received by systems according to the present disclosure.

To facilitate visualization of drilling information, systems and methods in accordance with this disclosure use what are referred to herein as three dimensional ("3D") well cross sections. A 3D well cross section is a projection of a wellbore with x- and y-components such that the result of the projection is a curved vertical plane. In contrast to the 3D well cross sections, vertical sections are flat plane projection defined by a collection of xy-component and z-component pairings. Thus, the well 3D section is a curved cross section of the earth in three dimensions that intersects a wellbore (composite or other) of a drilling well whereas the well vertical section is a planar surface in two dimensions onto which the well 3D section is projected along a specified azimuth.

Figure 11:
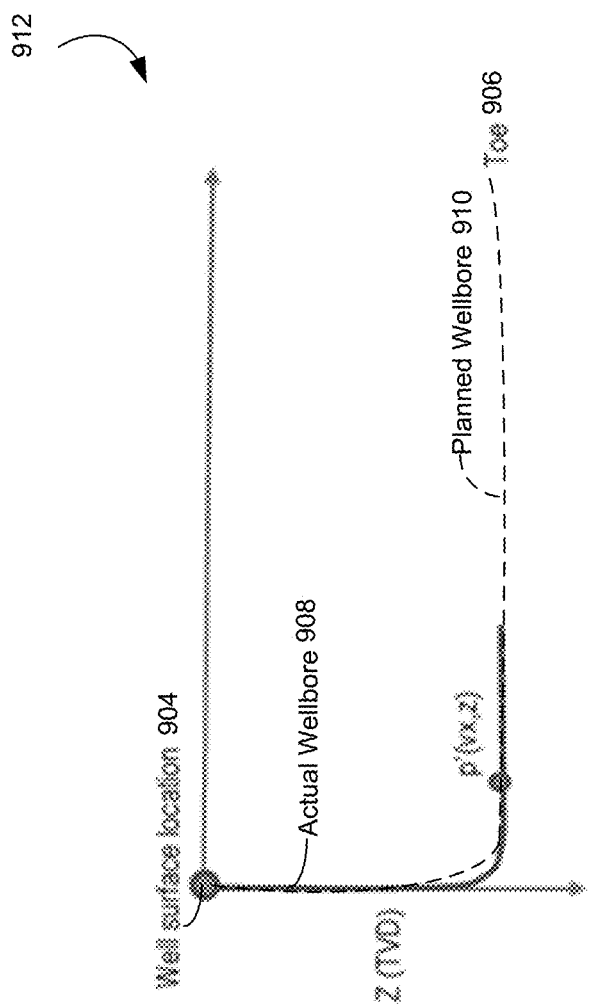
FIG. 11 illustrates a vertical section of the drilling plan of FIG. 9.

In FIG. 10, for example, a 3D well cross section 920 is defined along the composite wellbore. More specifically, the 3D well cross section 920 is a curved plane resulting from the composite wellbore being projected with x- and y-components. FIG. 10 also includes a vertical section 912, which is a flat plane projection of the composite wellbore defined by a collection of xy-component and z-component pairings. FIG. 11 illustrates the vertical section 912 of FIG. 10 in additional detail. As shown, the vertical section 912 includes a projection of information corresponding to the composite wellbore onto a vertical plane along a specified azimuth. Notably, any point on the wellbore path, such as point p (shown in FIG. 10), can be projected onto the vertical section. For example, the point p may be projected normal to the azimuth onto the vertical section 912 to a point p'. Accordingly, the well vertical section may include actual, planned, or composite wellbore information projected on the well vertical section.

In addition actual, planned, and composite wellbore data, each of the 3D well cross section 920 and the vertical section 912 may also display additional features. For example, and without limitation, fault boundaries, formation information, property boundaries, and other information, may also be projected onto either the 3D well cross section 912 or the vertical section. Stated differently, geoscientific data, which may be comprised of geologic formation and fault surfaces, may form intersections with the well 3D cross section 920. Such intersections can then be projected onto the vertical section 912 with the same techniques used to project the actual, planned, and/or composite wellbore data onto the vertical section 912.

The 3D well cross section 920 and the vertical section 912 may be stored as image data within a computing system, such as the drilling management system 102 of FIG. 1, and later retrieved for visualization and analysis. For example, the three dimensional well data may be stored as a 3D seismic image cube with the discrete points of well data represented as pixels of the 3D seismic image cube. Accordingly, the 3D well cross section 920 corresponds to a single pixel vertical plane that may be used to form a 2D image tracking the 3D well cross section 920. Each pixel of the 3D well cross section 920 can then be projected again onto a specific plane extending through the 3D seismic image cube to create an image of the vertical section 912. Accordingly, the 3D well cross section 920 and the vertical section 912 may be readily displayed to members of an asset team or other users of the drilling management system 102. Moreover, visualization of the 3D image cube may be readily changed between 3D representations more commonly used by geoscientists and 2D representations more commonly used by drilling engineers and technicians to facilitate communication between such parties.

Figure 12:
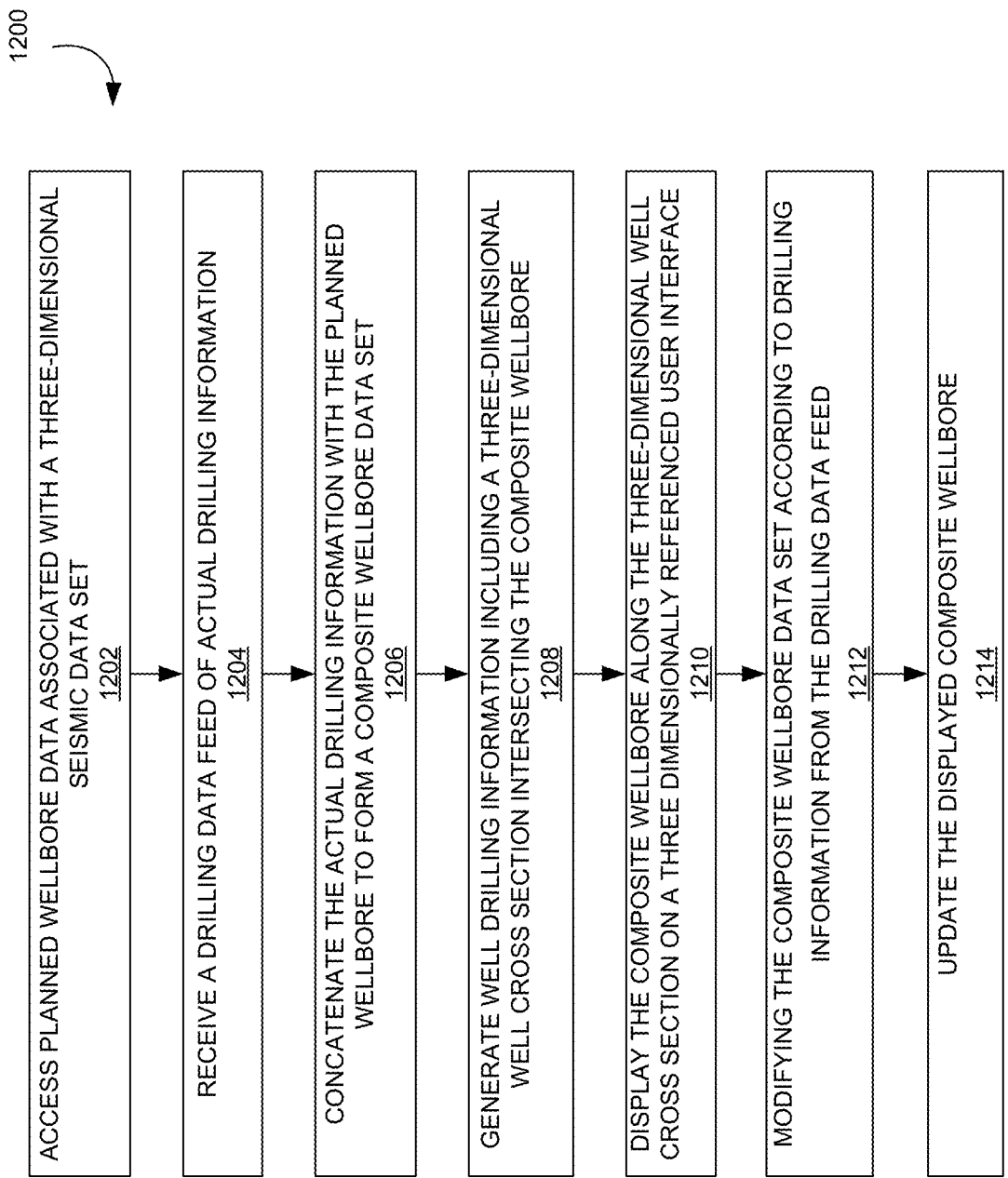
FIG. 12 illustrates a method of generating and displaying drilling information corresponding to a composite wellbore.

FIG. 12 an example method 1200 of generating and displaying well drilling information. It should be understood that there can be additional, fewer, or alternative steps performed in similar or alternative orders, or in parallel, within the scope of the various embodiments unless otherwise stated. Generally, the method 1200 includes the process of generating and displaying a composite wellbore, such as the composite wellbore 918 illustrated in FIGS. 9-11, and updating the displayed composite wellbore in response to receiving updated drilling information from an active drilling operation. The following discussions of FIGS. 12-14 make additional reference to the system 100 and drilling management system 102 of FIGS. 1 and 2. Such references are intended only to provide context to the following descriptions of the methods illustrated in FIGS. 12-14.

At block 1202, planned wellbore data associated with a previously captured three-dimensional seismic data set is accessed, such as by the drilling management system 102. Such planned wellbore data may include, without limitation, three-dimensional points or similar geometric parameters defining the planned wellbore within a region of a subterranean formation for which three-dimensional seismic data has been previously obtained.

At block 1204, the drilling management system 102 receives a drilling data feed of actual drilling information for an actual wellbore associated with the planned wellbore. For example, with reference to FIG. 1, the drilling management system 102 may receive data from one or more of the drilling sites 106. Such data may be received and processed by the drilling management system 102 in real time during the course of a drilling operation or may corresponding to a stored drilling feed for a previous drilling operation. The drilling data feed may be generated, for example, by an MWD or similar measurement device configured to track and measure progress of a drilling operation. Similar to the planned wellbore data, the drilling data feed may include, three-dimensional points or similar geometric parameters defining the actual wellbore within the region of the subterranean formation corresponding to the three-dimensional seismic data.

At block 1206, the drilling management system 102 concatenates the actual drilling information with the planned wellbore data to form a composite wellbore data set. The resulting composite wellbore data set, therefore, defines a composite wellbore that includes the actual wellbore that has been drilled with an undrilled portion of the planned wellbore. In instances when the actual wellbore deviates from the planned wellbore, concatenation of the actual wellbore and the planned wellbore may include interpolating or otherwise inserting one or more data points between the actual wellbore data and a portion of the planned wellbore data such that the resulting composite wellbore data set is continuous.

At block 1208, the drilling management system 102 generates well drilling information including a three-dimensional well cross section intersecting the composite wellbore. As previously discussed in the context of FIGS. 9-11, the three-dimensional well cross section is a curved vertical plane that intersects the composite wellbore including a representation of the composite wellbore and that may further include other geological and seismic data extending vertically from the composite wellbore.

At block 1210, the three-dimensional well cross section is displayed on a three-dimensionally reference user interface. For example, in certain implementations, a client device, such as one of the client devices 108 of FIG. 1, may be used to access the drilling management system 102, to retrieve the data corresponding to the three-dimensional well cross section from the drilling management system 102, and to render the data in a three-dimensional user interface. In certain implementations, the drilling management system 102 is accessed through a web browser or similar application and display of the data may occur in the context of a shared visualization session, such as previously described in this disclosure.

At block 1212, additional drilling information is received from the drilling data feed. For example, the drilling management system 102 may receive one or more updated data points corresponding to the actual drilling path of a drilling operation performed at one of the drilling sites 106. In response to receiving the updated drilling information, the drilling management system 102 may update the previously generated three-dimensional well cross section to include the updated drilling data. For example, the drilling management system 102 may repeat the one or more of the operations of blocks 1202-1208 to generate an updated composite wellbore that includes the recently received actual drilling data.

At block 1214, the updated composite wellbore is displayed. To display the updated composite wellbore, the drilling management system 102 may forward the updated composite wellbore data set to one or more of the client devices 108 currently engaged in a visualization session including the composite wellbore. The client devices 108 may then render the updated composite wellbore data set accordingly to reflect changes to the actual and composite wellbore.

Displaying the composite wellbore may include displaying additional data stored within or otherwise available to the drilling management system 102. For example, in certain implementations, image data included in the 3D seismic data set may be projected onto the 3D well cross section and displayed along with the composite wellbore. Other data, such as the location of geological features, intersections between geological features and the composite wellbore, and points of interest may also be displayed. In certain implementations, for example, a user of a client device 108 may be able to add one or more feature points or similar points of interest to a visualization displayed on the user interface which may then be shared with any other users that may be participating in a shared visualization session with the user. Additional information, such as the distance and angle between identified feature points may also be computed and displayed.

Figure 13:
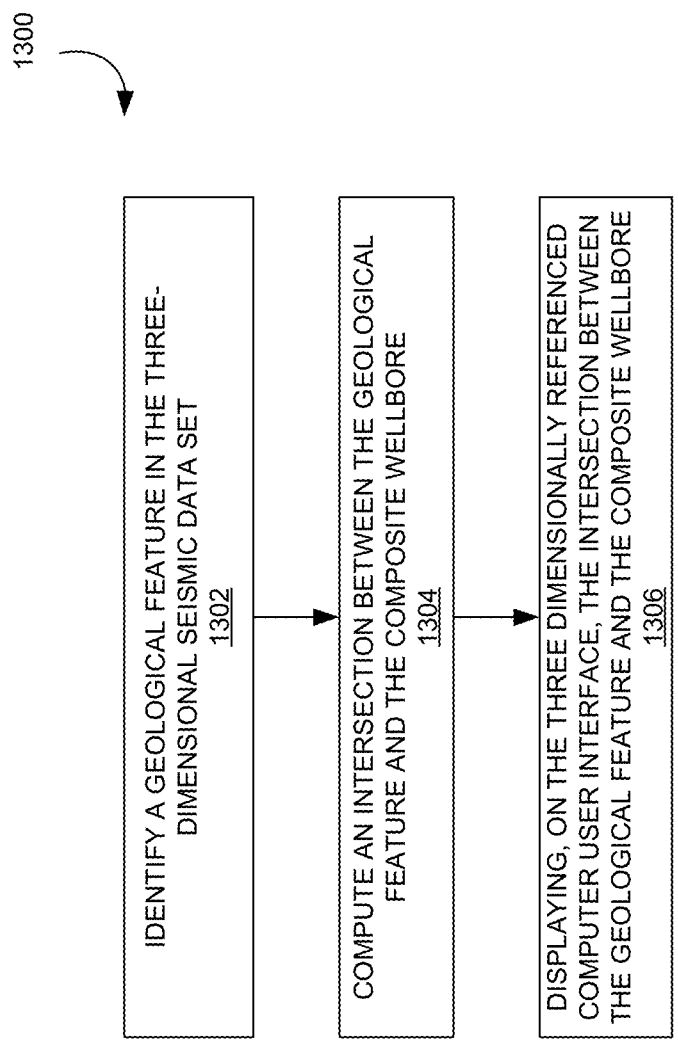
FIG. 13 illustrates a method of supplementing and displaying composite wellbore data with geological feature data.

FIG. 13 is an example method 1300 of displaying additional data of a 3D seismic data set with a composite wellbore derived. It should be understood that there can be additional, fewer, or alternative steps performed in similar or alternative orders, or in parallel, within the scope of the various embodiments unless otherwise stated.

At block 1302, a geological feature is identified in the 3D seismic data set. Such geological features may include, without limitation, one or more of a pre-existing wellbore, a fault plane, and a lease boundary. Such features may be represented in the 3D seismic data set as one or more points, lines, planes, or other geometric shapes within the 3D seismic data.

At block 1304, an intersection between the geological feature and the composite wellbore data is computed. For example, the drilling management system 102 may compare the points or geometric parameters of the composite wellbore to those of identified geological features of the 3D seismic data set to identify points, lines, or planes along which the composite wellbore and the geological features intersect.

At block 1306, the intersection between the geological feature and the composite wellbore data is displayed on a three dimensionally referenced computer user interface, such as the three dimensionally referenced user interface discussed in the context of the method 1200 of FIG. 12. As previously discussed in the context of FIG. 12, the composite wellbore and 3D well cross section may be displayed on one or more client devices 108 engaged in a visualization session. To the extent the drilling management system 102 identifies an intersection between composite wellbore and a geological feature, such intersections may be highlighted, marked, or otherwise indicated in the data rendered by the client devices 108 such that the intersections are rendered in a manner that increases their visibility. For example, the intersections may be rendered by the client devices 108 in a different color, line thickness, line pattern, or other manner distinct from the rendering of the composite wellbore.

Figure 14:
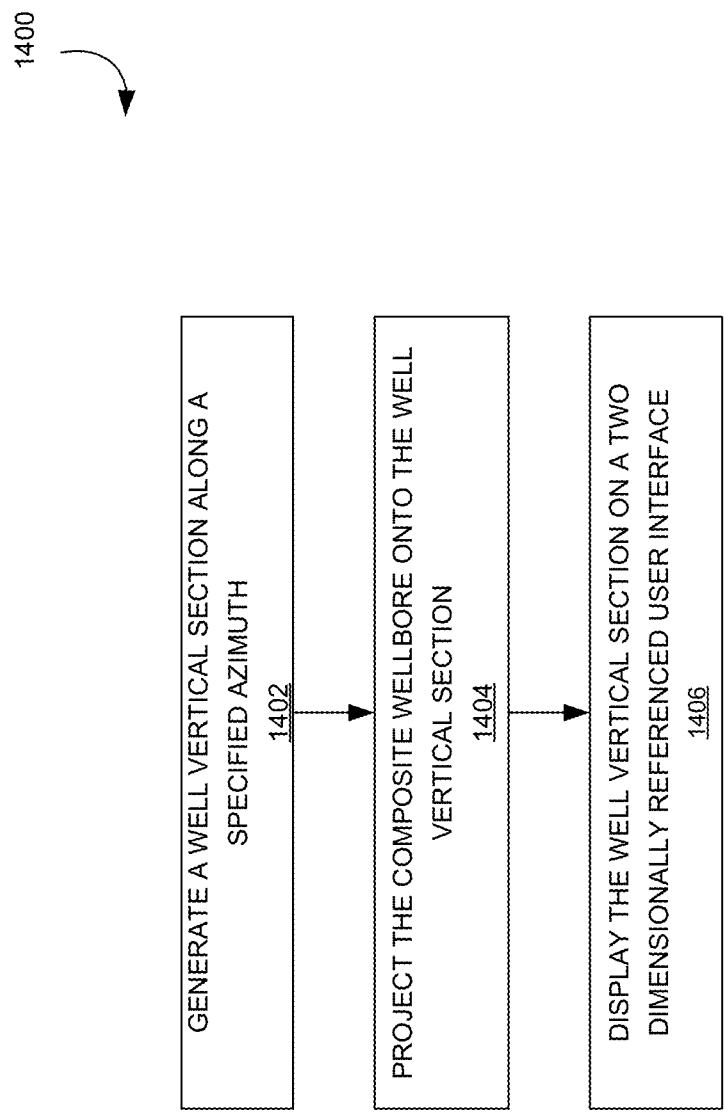
FIG. 14 illustrates a method of generating and displaying a vertical section of a well bore.

FIG. 14 is an example method 1400 of displaying drilling and well information in a two dimensional representation. It should be understood that there can be additional, fewer, or alternative steps performed in similar or alternative orders, or in parallel, within the scope of the various embodiments unless otherwise stated.

At block 1402, a well vertical section is generated subsequent to the generation of a composite wellbore as described in the context of the method 1200 of FIG. 12. In certain implementations, for example, the drilling management system 102 generates the well vertical section by identifying an origin of a planned wellbore and extending a vertical plane from the planned wellbore origin along a specified azimuth. The specified azimuth may correspond to a default azimuth value, such as the azimuth defined by the origin and toe of the planned wellbore, or may be specified by a user of a client device 108 in communication with the drilling management system 102.

At block 1404, the composite wellbore is then projected onto the well vertical section. In certain implementations, the composite wellbore may be projected onto the well vertical section directly from 3D data representing the composite wellbore. In other implementations, the composite wellbore may first be projected onto a 3D well cross section which is then projected onto the vertical section. Projection of the composite wellbore onto the vertical section may also include projecting additional data onto the vertical section. Such data may include, without limitation, intersections between the composite wellbore and geological features and image data, such as seismic image data. The vertical section may also include feature points noted by users of the drilling management system 102 and corresponding data, such as the distances between feature points.

At block 1406, the well vertical section is then displayed to a user through a two dimensionally references user interface. For example, after projecting the composite wellbore and any additional drilling information onto the vertical section, the corresponding data may be transmitted by the drilling management system 102 to one or more of the client devices 108 for rendering and display.

In certain implementations of the present disclosure, the user interface accessible by the client devices 108 may include various additional features for readily viewing and analyzing wellbore and drilling information. For example, in certain implementations, the user interface may include a switch, button, or similar control through which a command may be received to switch between a three dimensionally referenced user interface and a two dimensionally referenced user interface. In response to such changes, the drilling management system 102 may transmit corresponding 3D data (such as data corresponding to a 3D well cross section) or 2D data (such as data corresponding to a vertical well section) to one or more client devices 108 that then render and display the received data.

Figure 15A:
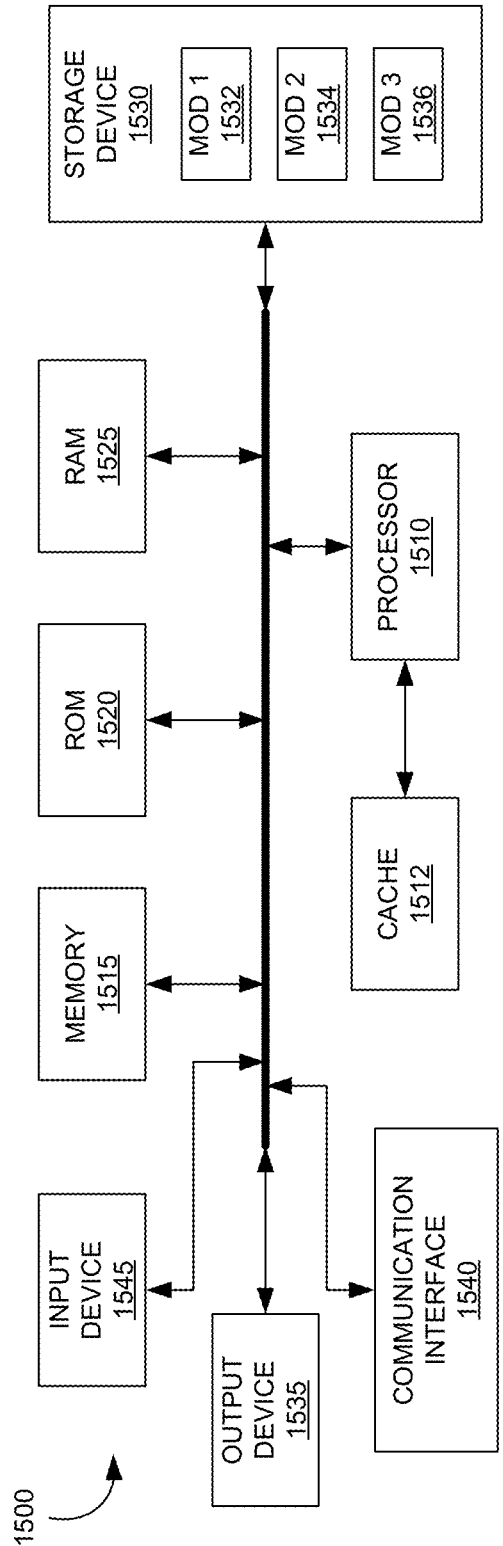
FIGS. 15A and 15B illustrate exemplary possible system embodiments.
Figure 15B:
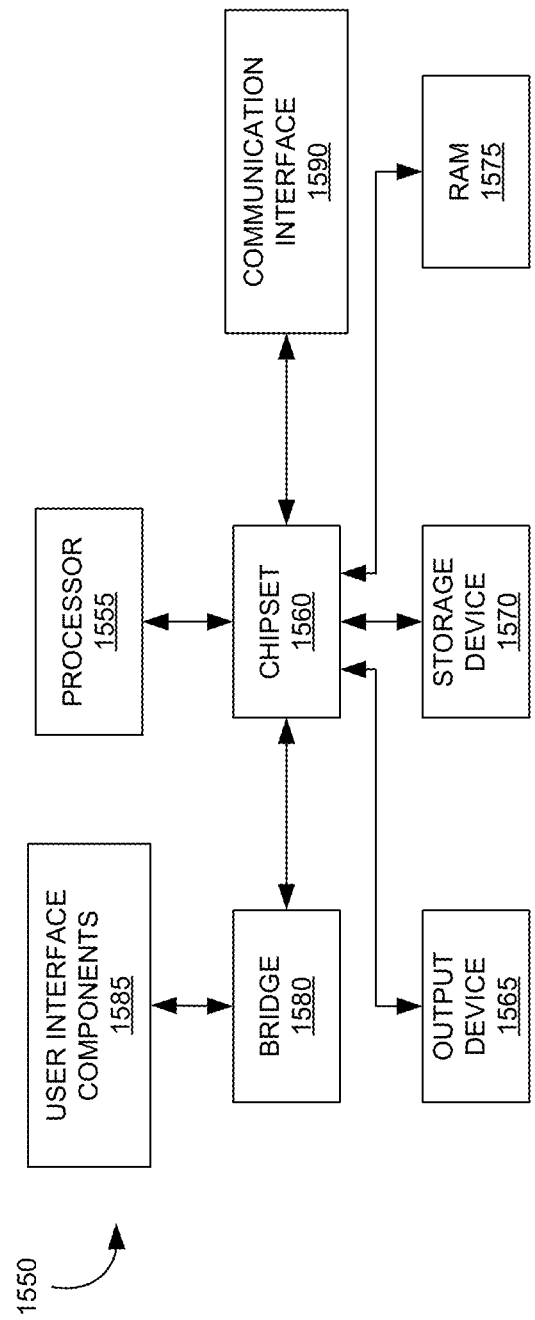

FIG. 15A, and FIG. 15B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 15A illustrates a system bus computing system architecture 1500 wherein the components of the system are in electrical communication with each other using a bus 1505. Exemplary system 1500 includes a processing unit (CPU or processor) 1510 and a system bus 1505 that couples various system components including the system memory 1515, such as read only memory (ROM) 1520 and random access memory (RAM) 1525, to the processor 1510. The system 1500 can include a cache of high-speed memory connected directly with, in close proximity to, or integrated as part of the processor 1510. The system 1500 can copy data from the memory 1515 and/or the storage device 1530 to the cache 1512 for quick access by the processor 1510. In this way, the cache can provide a performance boost that avoids processor 1510 delays while waiting for data. These and other modules can control or be configured to control the processor 1510 to perform various actions. Other system memory 1515 may be available for use as well. The memory 1515 can include multiple different types of memory with different performance characteristics. The processor 1510 can include any general purpose processor and a hardware module or software module, such as module 1 1532, module 2 1534, and module 3 1536 stored in storage device 1530, configured to control the processor 1510 as well as a special-purpose processor where software instructions are incorporated into the actual processor design. The processor 1510 may essentially be a completely self-contained computing system, containing multiple cores or processors, a bus, memory controller, cache, etc. A multi-core processor may be symmetric or asymmetric.

To enable user interaction with the computing device 1500, an input device 1545 can represent any number of input mechanisms, such as a microphone for speech, a touch-sensitive screen for gesture or graphical input, keyboard, mouse, motion input, speech and so forth. An output device 1535 can also be one or more of a number of output mechanisms known to those of skill in the art. In some instances, multimodal systems can enable a user to provide multiple types of input to communicate with the computing device 1500. The communications interface 1540 can generally govern and manage the user input and system output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof.

The storage device 1530 can include software modules 1532, 1534, 1536 for controlling the processor 1510. Other hardware or software modules are contemplated. The storage device 1530 can be connected to the system bus 1505. In one aspect, a hardware module that performs a particular function can include the software component stored in a computer-readable medium in connection with the necessary hardware components, such as the processor 1510, bus 1505, display 1535, and so forth, to carry out the function.

FIG. 15B illustrates a computer system 1550 having a chipset architecture that can be used in executing the described method and generating and displaying a graphical user interface (GUI). Computer system 1550 is an example of computer hardware, software, and firmware that can be used to implement the disclosed technology. System 1550 can include a processor 1555, representative of any number of physically and/or logically distinct resources capable of executing software, firmware, and hardware configured to perform identified computations. Processor 1555 can communicate with a chipset 1560 that can control input to and output from processor 1555. In this example, chipset 1560 outputs information to output 1565, such as a display, and can read and write information to storage device 1570, which can include magnetic media, and solid state media, for example. Chipset 1560 can also read data from and write data to RAM 1575. A bridge 1580 for interfacing with a variety of UI components 1585 can be provided for interfacing with chipset 1560. Such UI components 1585 can include a keyboard, a microphone, touch detection and processing circuitry, a pointing device, such as a mouse, and so on. In general, inputs to system 1550 can come from any of a variety of sources, machine generated and/or human generated.

Chipset 1560 can also interface with one or more communication interfaces 1590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1555 analyzing data stored in storage 1570 or 1575. Further, the machine can receive inputs from a user via UI components 1585 and execute appropriate functions, such as browsing functions by interpreting these inputs using processor 1555.

It can be appreciated that exemplary systems 1500 and 1550 can have more than one processor 1510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method of generating well drilling information comprising:
    obtaining a planned wellbore data set for a planned wellbore associated with a three-dimensional seismic data set, the planned wellbore data set including three-dimensional coordinate data for a planned wellbore, wherein the three-dimensional coordinate data for the planned wellbore defines a planned drilling path fixed prior to drilling an actual wellbore associated with the planned wellbore;
    receiving a drilling data feed of actual wellbore data from a drilling site, the actual wellbore data including three-dimensional coordinate data corresponding to the actual wellbore associated with the planned wellbore, wherein the three-dimensional coordinate data corresponding to the actual wellbore describes an actual drilling path;

generating a composite wellbore data set including three-dimensional coordinate data for a composite wellbore by concatenating the three-dimensional coordinate data of the actual wellbore with a portion of the three-dimensional coordinate data of the planned wellbore data corresponding to an undrilled portion of the planned wellbore such that the three-dimensional coordinate data for the composite wellbore defines a continuous drilling path including the actual drilling path as the drilling data feed of the actual wellbore data is received and the portion of the planned drilling path corresponding to the undrilled portion of the planned wellbore;

displaying a representation of the composite wellbore along the three-dimensional well cross section;

modifying the composite wellbore data set according to the drilling data feed; and updating the displayed composite wellbore based on the modified composite wellbore data set.

2. The method of claim 1, wherein generating the composite wellbore data set further comprises interpolating one or more three-dimensional coordinates between the three-dimensional coordinate data of the actual wellbore and the portion of the three-dimensional coordinate data of the planned wellbore data.

3. The method of claim 1 further comprising generating a three-dimensional well cross section intersecting the composite wellbore by projecting the three-dimensional coordinate data of the composite well bore with x- and y-components onto a curved vertical plane.

4. The method of claim 3 further comprising displaying the representation of the composite wellbore along the three-dimensional well cross section on a three dimensionally referenced user interface or a two dimensionally referenced user interface.

5. The method of claim 4 further comprising:
identifying a geological feature in the three-dimensional seismic data set;
computing an intersection between the geological feature and the composite wellbore, wherein computing an intersection between the geological feature and the composite wellbore comprises identifying an overlap between the three-dimensional coordinate data defining the composite wellbore and the three-dimensional seismic data corresponding to the geological feature; and
displaying, on the three dimensionally referenced user interface, the intersection between the geological feature and the composite wellbore.

6. The method of claim 4 further comprising:
generating, from the three-dimensional seismic data, image data for a formation along the three-dimensional well cross section; and
displaying, on the three dimensionally referenced user interface, the image data on the three-dimensional well cross section.

7. The method of claim 4 further comprising:
modifying the composite wellbore data set according to the drilling data feed during a drilling operation;
regenerating at least a portion of the composite wellbore data set to yield an updated composite wellbore data set;
generating an updated three-dimensional well cross section based on the updated composite wellbore data set; and
displaying the updated three-dimensional well cross section on the three dimensionally referenced user interface.

8. The method of claim 3 further comprising generating a well vertical section from a well origin of the planned wellbore along a specified azimuth, wherein generating the well vertical section comprises projecting the composite wellbore data set onto a flat vertical plane extending from the well origin along the specified azimuth.

9. The method of claim 8 further comprising projecting at least one of an intersection between a geological feature and the composite wellbore and image data for a formation along the three-dimensional well cross section onto the well vertical section.

10. The method of claim 8 further comprising displaying the well vertical section on a two dimensionally referenced user interface.

11. The method of claim 8 further comprising switching, in response to a command received from a user, between displaying the well vertical section using a two dimensionally referenced user interface and the three-dimensional well cross section using a three dimensionally referenced user interface.

12. The method of claim 1 further comprising color coding the actual wellbore data and planned wellbore data aspects of the composite wellbore for display on at least one of a three dimensionally referenced user interface and a two dimensionally referenced user interface.

13. The method of claim 1 further comprising:
receiving selections of a first feature point displayed on a three dimensionally referenced user interface and a second feature point displayed on the three dimensionally referenced user interface;
projecting the first feature point and the second feature point on a vertical well section, wherein the vertical well section is a flat vertical plane extending from a well origin of the planned wellbore data along a specified azimuth; and
displaying the first feature point and the second feature point in a two dimensionally referenced user interface.

14. The method of claim 13 further comprising computing a distance between the first feature point and the second feature point as projected on the vertical well section.

15. A drilling management system comprising:
one or more computer processors; and
a memory storing instructions that, when executed by the one or more computer processors, cause the drilling management system to:
obtain a planned wellbore data set for a planned wellbore associated with a three-dimensional seismic data set, the planned wellbore data set including three-dimensional coordinate data for a planned wellbore, wherein the three-dimensional coordinate data for the planned wellbore defines a planned drilling path fixed prior to drilling an actual wellbore associated with the planned wellbore;
receive a drilling data feed of actual wellbore data from a drilling site, the actual wellbore data including three-dimensional coordinate data corresponding to an actual wellbore associated with the planned wellbore, wherein the three-dimensional coordinate data corresponding to the actual wellbore describes an actual drilling path;
generate a composite wellbore data set including three-dimensional coordinate data for a composite wellbore by concatenating the three-dimensional coordinate data of the actual wellbore with a portion of the three-dimensional coordinate data of the planned wellbore data corresponding to an undrilled portion of the planned wellbore such that the three-dimensional coordinate data for the composite wellbore defines a continuous drilling path including the actual drilling path as the drilling data feed of the actual wellbore data is received and the portion of the planned drilling path corresponding to the undrilled portion of the planned wellbore;

display a representation of the composite wellbore along the three-dimensional well cross section;

modify the composite wellbore data set according to the drilling data feed; and update the displayed composite wellbore based on the modified composite wellbore data set.

16. The drilling management system of claim 15, wherein the instructions further cause the drilling management system to generate the composite wellbore data set by interpolating one or more three-dimensional coordinates between the three-dimensional coordinate data of the actual wellbore and the portion of the three-dimensional coordinate data of the planned wellbore data.

17. The drilling management system of claim 15, wherein the instructions further cause the drilling management system to generate a three-dimensional well cross section intersecting the composite wellbore by projecting the three-dimensional coordinate data of the composite well bore with x- and y-components onto a curved vertical plane.

18. The drilling management system of claim 17, wherein the instructions further cause the drilling management system to display a representation of the composite wellbore along the three-dimensional well cross section on a three dimensionally referenced user interface or a two dimensionally referenced user interface.

19. The drilling management system of claim 18, wherein the instructions further cause the drilling management system to:
    identify a geological feature in the three-dimensional seismic data set;
    compute an intersection between the geological feature and the composite wellbore, wherein computing an intersection between the geological feature and the composite wellbore comprises identifying an overlap between the three-dimensional coordinate data defining the composite wellbore and the three-dimensional seismic data corresponding to the geological feature; and
    display, on the three dimensionally referenced user interface, the intersection between the geological feature and the composite wellbore.

20. The drilling management system of claim 18, wherein the instructions further cause the drilling management system to:
    generate, from the three-dimensional seismic data, image data for a formation along the three-dimensional well cross section; and
    display, on the three dimensionally referenced user interface, the image data on the three-dimensional well cross section.

21. The drilling management system of claim 18, wherein the instructions further cause the drilling management system to:
    modify the composite wellbore data set according to the drilling data feed during a drilling operation;
    regenerate at least a portion of the composite wellbore data set to yield an updated composite wellbore data set;
    generate an updated three-dimensional well cross section based on the updated composite wellbore data set; and
    display the updated three-dimensional well cross section on the three dimensionally referenced user interface.

22. The drilling management system of claim 17, wherein the instructions further cause the drilling management system to generate a well vertical section from a well origin of the planned wellbore along a specified azimuth, wherein generating the well vertical section comprises projecting the composite wellbore data set onto a flat vertical plane extending from the well origin along the specified azimuth.

23. The drilling management system of claim 22, wherein the instructions further cause the drilling management system to project at least one of an intersection between a geological feature and the composite wellbore and image data for a formation along the three-dimensional well cross section onto the well vertical section.

24. The drilling management system of claim 22, wherein the instructions further cause the drilling management system to display the well vertical section on a two dimensionally referenced user interface.

25. The drilling management system of claim 22, wherein the instructions further cause the drilling management system to switch, in response to a command received from a user, between displaying the well vertical section using a two dimensionally referenced user interface and the three-dimensional well cross section using a three dimensionally referenced user interface.

26. The drilling management system of claim 25, wherein the instructions further cause the drilling management system to color code the actual wellbore data and planned wellbore data aspects of the composite wellbore for display on at least one of a three dimensionally referenced user interface and a two dimensionally referenced user interface.

27. The drilling management system of claim 25, wherein the instructions further cause the drilling management system to:
    receive selections of a first feature point displayed on a three dimensionally referenced user interface and a second feature point displayed on the three dimensionally referenced user interface;
    project the first feature point and the second feature point on a vertical well section, wherein the vertical well section is a flat vertical plane extending from a well origin of the planned wellbore data along a specified azimuth; and
    display the first feature point and the second feature point in a two dimensionally referenced user interface.

28. The drilling management system of claim 27, wherein the instructions further cause the drilling management system to compute a distance between the first feature point and the second feature point as projected on the vertical well section.

* * * * *